United States Patent
Brown et al.

(10) Patent No.: US 10,947,355 B2
(45) Date of Patent: Mar. 16, 2021

(54) FUNCTIONAL SURFACES AND METHODS OF MAKING THEREOF

(71) Applicant: Ohio State Innovation Foundation, Columbus, OH (US)

(72) Inventors: Philip Simon Brown, Columbus, OH (US); Bharat Bhushan, Powell, OH (US)

(73) Assignee: Ohio State Innovation Foundation, Columbus, OH (US)

(*) Notice: Subject to any disclaimer, the term of this patent is extended or adjusted under 35 U.S.C. 154(b) by 183 days.

(21) Appl. No.: 15/193,821

(22) Filed: Jun. 27, 2016

(65) Prior Publication Data
US 2017/0369664 A1   Dec. 28, 2017

(51) Int. Cl.
    C08J 7/06    (2006.01)
    C09D 7/63    (2018.01)
    C09D 7/61    (2018.01)

(52) U.S. Cl.
    CPC ........... *C08J 7/065* (2013.01); *C09D 7/61* (2018.01); *C09D 7/63* (2018.01); *C08J 2323/12* (2013.01); *C08J 2369/00* (2013.01)

(58) Field of Classification Search
    CPC .................................................. C08J 7/065
    USPC ........................................................ 427/336
    See application file for complete search history.

(56) References Cited

U.S. PATENT DOCUMENTS

| | | | | |
|---|---|---|---|---|
| 8,852,689 B2* | 10/2014 | Srinivas | ................ | A01N 25/34 427/191 |
| 2007/0141305 A1* | 6/2007 | Kasai | ...................... | B05D 5/08 428/143 |
| 2013/0251948 A1* | 9/2013 | Lyons | ...................... | B32B 5/16 428/148 |

OTHER PUBLICATIONS

Transparent Superhydrophobic/Translucent Superamphiphobic Coatings Based on Silica-Fluoropolymer Hybrid Nanoparticles, Langmuir, Nov. 2013, p. 15051-15057.*
Ming, Superhydrophobic Films from Raspberry-like Particles, Nano Letters, 2005, vol. 5 No. 11, p. 2298-2301 (Year: 2005).*
"Anonymous 2014 Typical engineering properties of polypropylene.", See http://www.ineos.com/globalassets/ineos-group/businesses/ineos-olefins-and-polymers-usa/products/technical-information—patents/ineos-engineering-properties-of-pp.pdf, (accessed May 12, 2016)., 2 pages.
Barthlott, et al., "Purity of the sacred lotus, or escape from contamination in biological surfaces", Planta 202, 1997, 1-8.
Bhushan, et al., "Anti-smudge screening apparatus for electronic touch screens", Microsyst. Technol. 19, 2013, 1261-1263.
Bixler, et al., "Rice- and Butterfly-Wing Effect Inspired Low Drag and Antifouling Surfaces: A Review", Crit. Rev. Solid State Mat. Sci. 40, 2015, 1-37.
Brown, et al., "Bioinspired, roughness-induced, water and oil superphilic and super-phobic coatings prepared by adaptable layer-by-layer technique", Sci. Rep. 5, doi:10.1038/srep14030, 2015, 1-16.
Brown, et al., "Designing bioinspired superoleophobic surfaces", doi:10.1063/1.4935126, 2016, 015703.
Brown, et al., "Durable, superoleophobic polymer—nanoparticle composite surfaces with re-entrant geometry via solvent-induced phase transformation", Sci. Rep. 6, doi:10.1038/srep21048, 2016, 1-11.
Brown, et al., "Mechanically durable, superoleophobic coatings prepared by layer-by-layer technique for anti-smudge and oil-water separation", Sci. Rep. 5, doi:10.1038/srep08701, 2015, 1-9.
Cao, et al., "Anti-Icing Superhydrophobic Coatings", Langmuir 25, 2009, 12444-12448.
Contreras, et al., "Permanent superhydrophobic polypropylene nanocomposite coatings by a simple one-step dipping process.", Appl. Surf. Sci. 307, 2014, 234-240.
Ebert, et al., "Durable Lotus-effect surfaces with hierarchical structure using micro- and nanosized hydrophobic silica particles", J. Colloid Interf. Sci. 368, doi:10.1016/j.jcis.2011.09.049, 2012, 584-591.
Erbil, et al., "Transformation of a simple plastic into a superhydrophobic surface", Science 299, 2003, 1377-1380.
Feng, et al., "A Super-Hydrophobic and Super-Oleophilic Coating Mesh Film for the Separation of Oil and Water", Angew. Chem., Int. Ed. 43, 2004, 2012-2014.
Gogolides, et al., "Hierarchical micro and nano structured, hydrophilic, superhydrophobic and superoleophobic surfaces incorporated in microfluidics, microarrays and lab on chip microsystems", Microelectron. Eng. 132, doi:10.1016/j.mee.2014.10.002, 2015, 135-155.
Grosu, et al., "Relation between the size of fog droplets and their contact angles with CR39 surfaces", Journal of Physics D: Applied Physics, vol. 37, No. 23, 2004, 3350-3355.
Hsieh, et al., "Influence of surface roughness on water- and oil-repellent surfaces coated with nanoparticles", Appl. Surf. Sci. 240, doi:10.1016/j.apsusc.2004.07.016, 2005, 318-326.
Jung, et al., "Wetting Behavior of Water and Oil Droplets in Three-Phase Interfaces for Hydrophobicity/philicity and Oleophobicity/philicity", Langmuir 25, 2009, 14165-14173.
Kumar, et al., "Simple approach to superamphiphobic overhanging silicon nanostructures.", J. Phys. Chem. C 114, doi:10.1021/jp9066422, 2010, 2936-2940.
Muthiah, et al., "Dual-layered-coated mechanically-durable superomniphobic surfaces with anti-smudge properties", J. Colloid Interface Sci. 409, doi:10.1016/j.jcis.2013.07.032, 2013, 227-236.
Nishimoto, et al., "Bioinspired self-cleaning surfaces with superhydrophobicity, superoleophobicity, and superhydrophilicity", RSC Adv. 3, doi:10.1039/C2RA21260A, 2013, 671-690.

(Continued)

*Primary Examiner* — Tabatha L Penny
(74) *Attorney, Agent, or Firm* — Meunier Carlin & Curfman LLC

(57) ABSTRACT

Methods of making functional surfaces, including liquid repellant surfaces that can exhibit selective wetting properties. Methods of forming the functional surfaces can comprise providing a dispersion of nanoparticles; and applying the dispersion to a polymer surface to form a multiplicity of re-entrant structures embedded within and protruding from the polymer surface. The re-entrant structures are formed from aggregates of the nanoparticles. Functional surfaces are prepared by these methods, as well as articles comprising these functional surfaces.

17 Claims, 12 Drawing Sheets

(56) References Cited

OTHER PUBLICATIONS

Peng, et al., "Mechanically durable superoleophobic aluminum surfaces with microstep and nanoreticula hierarchical structure for self-cleaning and anti-smudge properties", J. Colloid Interface Sci. 461, doi:10.1016/j.jcis.2015.09.027, 2015, 273-284.

Pham, et al., "Surface charge modification of nano-sized silica colloid", Aust. J. Chem. 60, doi:10.1071/CH07138, 2007, 662-666.

Tuteja, et al., "Designing superoleophobic surfaces", Sci. 318, 2007, 1618-22.

Tuteja, et al., "Robust omniphobic surfaces", Proc.Natl Acad. Sci. USA 105, doi:10.1073/pnas.0804872105, 2010, 18200-18205.

Wang, et al., "Filter Paper with Selective Absorption and Separation of Liquids that Differ in Surface Tension", ACS Appl. Mater. Interfaces 2 (3), DOI: 10.1021/am900704u, 2010, 677-683.

Zhu, et al., "A novel membrane showing both hydrophilic and oleophobic surface properties and its non-fouling performances for potential water treatment applications", J. Membr. Sci. 436, doi:10.1016/j.memsci.2013.02.019, 2013, 47-56.

\* cited by examiner

FUNCTIONAL SURFACES AND METHODS OF MAKING THEREOF

BACKGROUND

The surface properties of a coating, with regards to wetting by liquids, are determined by the chemistry and topography at the interface. By selecting the correct chemistry and topography, a coating can display a variety of liquid wetting properties. These properties can be exploited for a variety of applications. For instance, coatings that repel water (hydrophobic) are useful for self-cleaning applications. In nature, this is most evident in the lotus leaf (Barthlott, et al., 1997, *Planta*, 202, 1-8); the superhydrophobic properties of the leaf surface, achieved through the presence of hierarchical structure created by rough papillae and superimposed with hydrophobic wax nanotubules, cause water droplets to roll around the surface of the leaf, collecting contaminants as they go thus keeping the leaf clean (Barthlott, et al.). Coatings that attract water (hydrophilic) are useful for anti-fogging applications (Grosu, et al., 2004, *J. Phys. D*, 37, 3350-3355). Coatings with surface tensions lower than that of water (72 mN m$^{-1}$) but higher than that of oils (20-30 mN m$^{-1}$) can attract oils (oleophilic) but repel water and can be used to create oil-water separators (Feng, et al., 2004, *Angew. Chem., Int. Ed.*, 43, 2012-2014; Wang, et al., 2010, *ACS Appl. Mater. Interfaces*, 2, 677-683). In addition, their water repellency also makes them ideal for self-cleaning (Bhushan, B., 2012, *Biomimetics: Bioinspired Hierarchical-Structured Surfaces for Green Science and Technology*, Springer-Verlag, Heidelberg, Germany; Bixler, et al., 2015, *Crit. Rev. Solid State Mat. Sci.*, 40, 1-37) and anti-icing (Cao, et al., 2009, *Langmuir*, 25, 12444-12448) applications. Coatings with lower surface tensions (~20 mN m$^{-1}$ or less) will repel both oil (oleophobic) and water and are useful for anti-fouling such as in medical and transport applications, where both the oil-repellency and nanostructuring are of importance (Hsieh, et al., 2005, *Appl. Surf Sci.*, 240, 318-326; Tuteja, et al., 2007, *Science*, 318, 1618-1622; Jung, et al., 2009, *Langmuir*, 25, 14165-14173).

There are various existing methods for fabrication of coatings with different surface properties. In general, a "one-pot" technique where all the materials are mixed and deposited together is used. Such a technique can lead to a coating with poor durability as the (typically low surface tension) material used to achieve the desired surface properties is distributed throughout the coating. In addition, each surface property requires different materials and methods.

There remains a need in the art for coatings having improved properties, including desirable surface properties combined with durability, as well as improved methods of making such coatings.

SUMMARY

Provided herein are methods of making functional surfaces, including liquid repellant surfaces that can exhibit selective wetting properties. Methods of forming a functional surfaces can comprise providing a dispersion of nanoparticles; and applying the dispersion to a polymer surface to form a multiplicity of re-entrant structures embedded within and protruding from the polymer surface. The re-entrant structures are formed from aggregates of the nanoparticles.

In some embodiments, the dispersion can comprise nanoparticles dispersed in a solvent. In some cases, the solvent can comprise a solvent that induces a structural change in the polymer forming the polymer surface. For example, the solvent can comprise a solvent that induces a change in the melting point of the polymer forming the polymer surface, a solvent that induces a phase transformation in the polymer forming the polymer surface, a solvent that swells the polymer forming the polymer surface, a solvent that induces a change in the crystallinity of the polymer forming the polymer surface, or a combination thereof. In certain embodiments, the dispersion can comprise nanoparticles dispersed in a solvent that induces a structural change in the polymer forming the polymer surface. By way of example, in one embodiment, the polymer forming the polymer surface can comprise polycarbonate, and the dispersion can comprise nanoparticles dispersed in acetone.

In some embodiments, the dispersion can comprise nanoparticles dispersed in a solution comprising a solvent and a polymer. In certain embodiments, the polymer can be the same polymer that forms the polymer surface. By way of example, in one embodiment, the polymer forming the polymer surface can comprise polypropylene, and the dispersion can comprise nanoparticles dispersed in solution of polypropylene in xylene. In other embodiments, the polymer can be different than the polymer that forms the polymer surface.

In some embodiments, applying the dispersion to the polymer surface can comprise heating the dispersion and depositing the dispersion on the polymer surface. In some cases, heating the dispersion can comprise heating the dispersion to a temperature greater than the glass transition temperature of the polymer that forms the polymer surface. In certain cases, heating the dispersion can comprise heating the dispersion to a temperature greater than the melting point of the polymer that forms the polymer surface.

The nanoparticles can comprise nanoparticles of any suitable type and size. In some embodiments, the nanoparticles can have an average particle size, as determined by electron microscopy, of from 1 nm to 500 nm (e.g., from 1 nm to 200 nm, from 1 nm to 100 nm, or from 1 nm to 50 nm). In some examples, the nanoparticles can comprise hydrophilic nanoparticles. In some cases when the nanoparticles comprise hydrophilic nanoparticles, the polymer surface can comprise a hydrophobic polymer surface. The nanoparticles can include, for example, alkaline earth metal oxide particles, transition metal oxide particles, lanthanide metal oxide particles, group IVA metal oxide particles, transition metal particles, transition-metal catalyst particles, particles comprising a transition metal adsorbed on a non-reactive support, metal alloy particles, silicate particles, aluminosilicate particles, particles comprising clays, and combinations thereof. In certain embodiments, the nanoparticles can comprise silicon dioxide nanoparticles.

The nanoparticles can be present in the dispersion in varying amounts. In some cases, the dispersion can comprise an effective concentration of nanoparticles to produce a functional surface that exhibits a water tilt angle of less than 10°, a hexadecane tilt angle of less than 10°, or a combination thereof. In certain cases, the dispersion can comprise from 5 mg/mL to 15 mg/mL nanoparticles (e.g., from 6 mg/mL to 10 mg/mL nanoparticles).

Optionally, methods of forming functional surfaces can further comprise depositing a functional material on the polymer surface. This can comprise, for example, activating the polymer surface, the multiplicity of re-entrant structures embedded within and protruding from the polymer surface, or a combination thereof for reaction with the functional material (e.g., UV activation of the polymer surface), and covalently attaching the functional material to the polymer surface, the multiplicity of re-entrant structures embedded within and protruding from the polymer surface, or a combination thereof. In some cases, the functional material can comprise a low surface energy material, such as a fluorosilane, a fluorosurfactant, a fluoropolymer, or a combination thereof. In certain embodiments, the functional material can comprise a fluorosilane.

The functional surface can exhibit a water contact angle of at least 150°, a hexadecane contact angle of at least 150°, or both a water contact angle of at least 150° and a hexadecane contact angle of at least 150°. The functional surface can exhibit a water tilt angle of less than 10°, a hexadecane tilt angle of less than 10°, or a water tilt angle of less than 10° and a hexadecane tilt angle of less than 10°. In some embodiments, the functional surface can exhibit a water contact angle of at least 150° and a water tilt angle of less than 10°. In some embodiments, the functional surface can exhibit a hexadecane contact angle of at least 150° and a hexadecane tilt angle of less than 10°. In certain embodiments, the functional surface can exhibit a water contact angle of at least 150°, a hexadecane contact angle of at least 150°, a water tilt angle of less than 10°, and a hexadecane tilt angle of less than 10°.

Also provided herein are functional surfaces made by the methods described herein, as well as articles comprising these surfaces. The functional surfaces can comprising a polymer and a multiplicity of re-entrant structures embedded within and protruding from the polymer. The multiplicity of re-entrant structures are formed from nanoparticle aggregates. Optionally, the functional surface can further comprise a functional material (e.g., a fluorosilane, a fluorosurfactant, a fluoropolymer, or a combination thereof) disposed on (e.g., covalently bound to) the polymer, the multiplicity of re-entrant structures embedded within and protruding from the polymer, or a combination thereof. In some embodiments, the functional surface can exhibit a water contact angle of at least 150° and a water tilt angle of less than 10°. In some embodiments, the functional surface can exhibit a hexadecane contact angle of at least 150° and a hexadecane tilt angle of less than 10°. In certain embodiments, the functional surface can exhibit a water contact angle of at least 150°, a hexadecane contact angle of at least 150°, a water tilt angle of less than 10°, and a hexadecane tilt angle of less than 10°.

DETAILED DESCRIPTION

Figure 1:
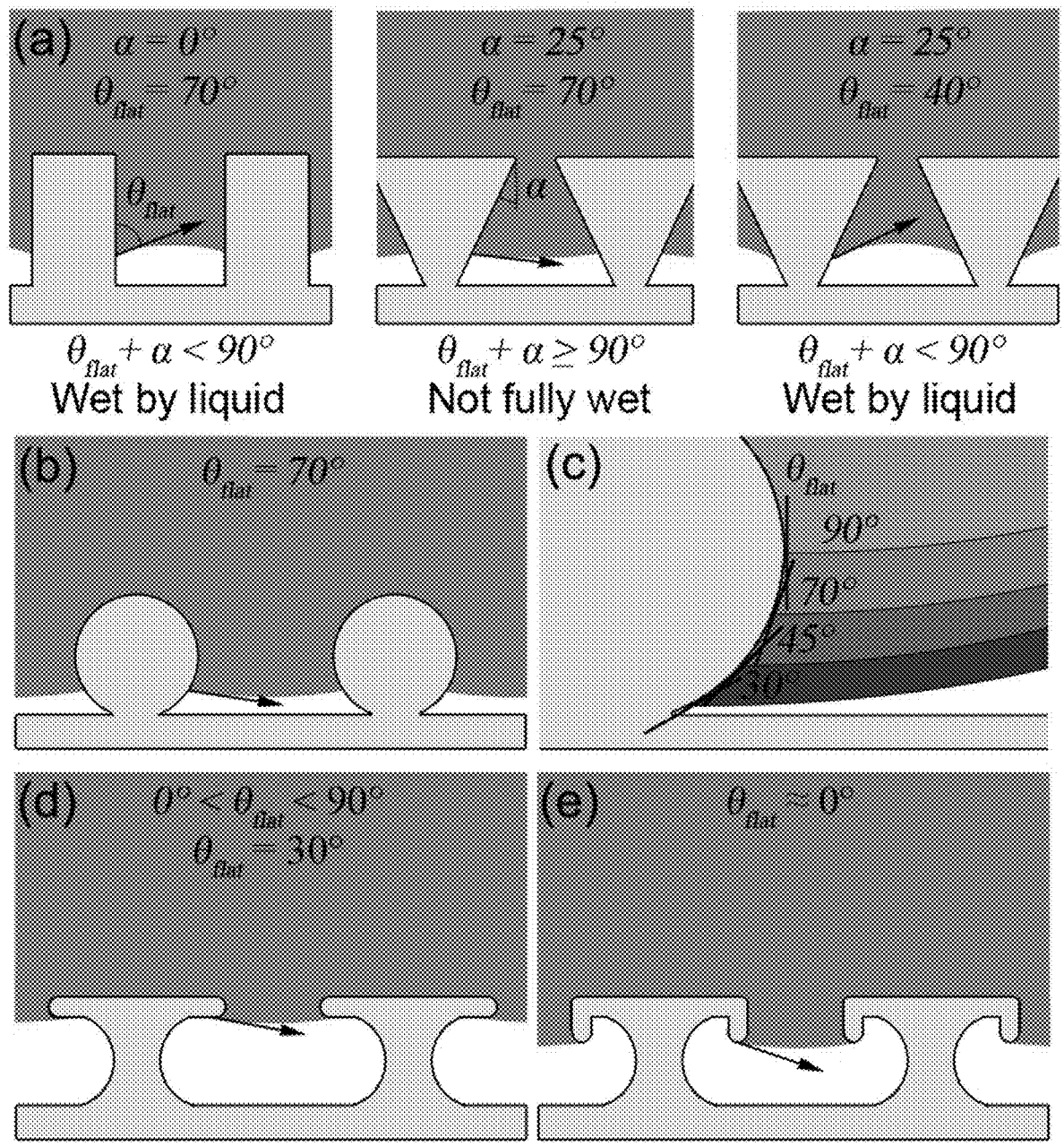
FIG. 1 illustrates a re-entrant surface geometry. Panel (a) illustrates $\theta_{flat}$ angles of <90° on non-re-entrant and re-entrant geometries. The liquid does not fully wet structure if $\theta_{flat}+\alpha \leq 90°$ thanks to favorable shape of the liquid-vapor interface. Panel (b) illustrates a geometry with re-entrant curvature supporting a $\theta_{flat}$ angle of 70°. Panel (c) illustrates a geometry with re-entrant curvature supporting various $\theta_{flat}$ angles of ≤90°. Panel (d) illustrates a re-entrant geometry supporting $\theta_{flat}$ angles of 30°. Panel (e) illustrates a doubly re-entrant geometry supporting $\theta_{flat}$ angles of ≈0°.

Provided herein are methods of making functional surfaces, including liquid repellant surfaces that can exhibit selective wetting properties. Methods of forming a functional surfaces can comprise providing a dispersion of nanoparticles; and applying the dispersion to a polymer surface to form a multiplicity of re-entrant structures embedded within and protruding from the polymer surface. The re-entrant structures are formed from aggregates of the nanoparticles.

The polymer surface can comprise any suitable polymer surface. The polymer surface can comprise a hydrophobic polymer, a hydrophilic polymer, or a combination thereof. In certain cases, the polymer surface can comprise a hydrophobic polymer. In some embodiments, the polymer surface can comprise a thermoplastic polymer. Examples of suitable polymers that can form the polymer surface include, but are not limited to, polyolefins (e.g., polypropylene, polyethylene, polyisobutylene, polymethylpentene, polybutylene, ethylene propylene rubber, and ethylene propylene diene monomer rubber), polycarbonates, polyesters (e.g., polyglycolic acid, polylactic acid, polycaprolactone, polyhydroxyalkanoates, polyethylene terephthalate (PET), polybutylene terephthalate, polytrimethylene terephthalate, and polyethylene naphthalate), polyurethanes, polyamides (e.g., Nylon), polystyrene, polyacrylates, ABS (acrylonitrile butadiene styrene copolymers), vinyl polymers (e.g., polyvinyl chloride), copolymers thereof, and blends thereof.

The dispersion can comprise nanoparticles dispersed in a solvent. Non-limiting examples of suitable solvents include aliphatic solvents (e.g., pentane, hexanes, cyclohexane); aromatic and/or alkylated aromatic solvents such as benzene, toluene, xylene;

hydrocarbon solvents; dichloromethane, chloroform, alcohols (e.g., methanol, ethanol, isopropanol); esters (e.g., ethyl acetate); ketones (e.g., acetone); diethyl ether; dioxane; glycol ethers and glycol ether esters; tetrahydrofuran; dimethylformamide; acetonitrile; dimethyl sulfoxide; water, and combinations thereof.

In some cases, the solvent can comprise a solvent that induces a structural change in the polymer forming the polymer surface. For example, the solvent can comprise a solvent that induces a change in the melting point of the polymer forming the polymer surface, a solvent that induces a phase transformation in the polymer forming the polymer surface, a solvent that swells the polymer forming the polymer surface, a solvent that induces a change in the crystallinity of the polymer forming the polymer surface, or a combination thereof. In certain embodiments, the dispersion can comprise nanoparticles dispersed in a solvent that induces a structural change in the polymer forming the polymer surface. By way of example, in one embodiment, the polymer forming the polymer surface can comprise polycarbonate, and the dispersion can comprise nanoparticles dispersed in acetone.

In some embodiments, the dispersion can comprise nanoparticles dispersed in a solution comprising a solvent and a polymer. In certain embodiments, the polymer can be the same polymer that forms the polymer surface. By way of example, in one embodiment, the polymer forming the polymer surface can comprise polypropylene, and the dispersion can comprise nanoparticles dispersed in solution of polypropylene in xylene. In other embodiments, the polymer can be different than the polymer that forms the polymer surface.

In some embodiments, applying the dispersion to the polymer surface can comprise heating the dispersion and depositing the dispersion on the polymer surface. In some cases, heating the dispersion can comprise heating the dispersion to a temperature greater than the glass transition temperature of the polymer that forms the polymer surface. In certain cases, heating the dispersion can comprise heating the dispersion to a temperature greater than the melting point of the polymer that forms the polymer surface.

The dispersion can be deposited on the polymer surface using any suitable casting technique. Examples of suitable casting techniques can include spray coating, dip coating, spin coating, flow coating, layer-by-layer coating, knife casting, film casting, vacuum-assisted dip-deposition, plasma deposition, or chemical vapor deposition. Dip coating includes a process in which a dispersion is contacted with the polymer surface. Excess dispersion is permitted to drain from the polymer surface, and solvent in the dispersion is evaporated at ambient or elevated temperature. Knife casting include a process in which a knife is used to draw the dispersion across the polymer surface to form a thin film of the dispersion of uniform thickness after which solvent in the dispersion is evaporated, at ambient or elevated temperatures. In certain embodiments, the dispersion can be deposited on the polymer surface by spin coating.

The nanoparticles can comprise nanoparticles of any suitable composition, shape, and size. The nanoparticles can include spherical particles, non-spherical particles (such as elongated particles, cylindrical particles, rod-like particles, or any irregularly shaped particles), or combinations thereof. In certain embodiments, nanoparticles can include spherical nanoparticles, nanotubes, nanoclusters, nanowires, or combinations thereof. In certain embodiments, the nanoparticles can comprise spherical nanoparticles.

In some examples, the nanoparticles can comprise hydrophilic nanoparticles. In some cases when the nanoparticles comprise hydrophilic nanoparticles, the polymer surface can comprise a hydrophobic polymer surface. In other examples, the nanoparticles can comprise hydrophobic nanoparticles. In some cases when the nanoparticles comprise hydrophobic nanoparticles, the polymer surface can comprise a hydrophilic polymer surface. The nanoparticles can include, for example, alkaline earth metal oxide particles, transition metal oxide particles, lanthanide metal oxide particles, group IVA metal oxide particles, transition metal particles, transition-metal catalyst particles, particles comprising a transition metal adsorbed on a non-reactive support, metal alloy particles, silicate particles, alumino-silicate particles, particles comprising clays, and combinations thereof. In certain embodiments, the nanoparticles can comprise silicon dioxide nanoparticles.

The nanoparticles can have an average particle size of less than 1 micron.

The term "average particle size," as used herein, generally refers to the statistical mean particle size (diameter) of the particles in a population of particles. The diameter of an essentially spherical particle may refer to the physical or hydrodynamic diameter. The diameter of a non-spherical particle may refer preferentially to the hydrodynamic diameter. As used herein, the diameter of an irregularly-shaped particle may refer to the largest linear distance between two points on the surface of the particle. As used herein, the diameter of the elongated particles, nanotubes, rod-like particles, or cylindrical particles may refer to the largest linear distance between two points on the horizontal cross-section of the particle. The mean particle size can be measured using methods known in the art, such as by dynamic light scattering or electron microscopy.

In some embodiments, the nanoparticles can have an average particle size, as determined by electron microscopy, of at least 1 nm (e.g., at least 5 nm, at least 10 nm, at least 15 nm, at least 20 nm, at least 25 nm, at least 30 nm, at least 35 nm, at least 40 nm, at least 45 nm, at least 50 nm, at least 75 nm, at least 100 nm, at least 125 nm, at least 150 nm, at least 175 nm, at least 200 nm, at least 225 nm, at least 250 nm, at least 300 nm, at least 350 nm, at least 400 nm, at least 450 nm, at least 500 nm, or more). In some embodiments, the nanoparticles can have an average particle size, as determined by electron microscopy, of 500 nm or less (e.g., 450 nm or less, 400 nm or less, 350 nm or less, 300 nm or less, 250 nm or less, 225 nm or less, 200 nm or less, 175 nm or less, 150 nm or less, 125 nm or less, 100 nm or less, 75 nm or less, 50 nm or less, 45 nm or less, 40 nm or less, 35 nm or less, 30 nm or less, 25 nm or less, 20 nm or less, 15 nm or less, 10 nm or less, or 5 nm or less).

The nanoparticles can have an average particle size, as determined by electron microscopy, ranging from any of the minimum values described above to any of the maximum values described above. In some embodiments, the nanoparticles can have an average particle size, as determined by electron microscopy, of from 1 nm to 500 nm (e.g., from 1 nm to 200 nm, from 1 nm to 100 nm, or from 1 nm to 50 nm).

In the cases of non-spherical (e.g., rod-like particles), the nanoparticles can have an average particle length of about 10 nm or greater. For example, the nanoparticles can have an average particle length of about 50 nm or greater, about 100 nm or greater, about 200 nm or greater, about 500 nm or greater, about 1 μm or greater, about 2 μm or greater, about 3 μm or greater, about 4 μm or greater, or about 5 μm or greater.

Non-spherical nanoparticles (e.g., rod-like particles) can also be described by their aspect ratio. In some embodiments, the nanoparticles in can have an average aspect ratio of length to diameter of from about 2:1 to about 250:1.

In some cases, the nanoparticles in the dispersion can be monodisperse in size. The term "monodisperse," as used herein, describes a population of nanoparticles where all of the nanoparticles are the same or nearly the same size. As used herein, a monodisperse nanoparticles size distribution refers to particle distributions in which 80% of the distribution (e.g., 85% of the distribution, 90% of the distribution, or 95% of the distribution) lies within 20% of the median particle size (e.g., within 15% of the median particle size, within 10% of the median particle size, or within 5% of the median particle size). In other examples, the dispersion can include nanoparticles of varying sizes (e.g., a mixture of two or more populations of nanoparticles having different average particle sizes).

The nanoparticles can be present in the dispersion in varying amounts. In some cases, the dispersion can comprise an effective concentration of nanoparticles to produce a functional surface that exhibits a water tilt angle of less than 10°, a hexadecane tilt angle of less than 10°, or a combination thereof. In some embodiments, the dispersion can comprise at least 5 mg/mL nanoparticles (e.g., at least 6 mg/mL nanoparticles, at least 7 mg/mL nanoparticles, at least 8 mg/mL nanoparticles, at least 9 mg/mL nanoparticles, at least 10 mg/mL nanoparticles, at least 11 mg/mL nanoparticles, at least 12 mg/mL nanoparticles, at least 13 mg/mL nanoparticles, or at least 14 mg/mL nanoparticles). In some embodiments, the dispersion can comprise 15 mg/mL nanoparticles or less (e.g., 14 mg/mL nanoparticles or less, 13 mg/mL nanoparticles or less, 12 mg/mL nanoparticles or less, 11 mg/mL nanoparticles or less, 10 mg/mL nanoparticles or less, 9 mg/mL nanoparticles or less, 8 mg/mL nanoparticles or less, 7 mg/mL nanoparticles or less, or 6 mg/mL nanoparticles or less).

The dispersion can comprise an amount of nanoparticles ranging from any of the minimum values described above to any of the maximum values described above. For example, in some embodiments, the dispersion can comprise from 5 mg/mL to 15 mg/mL nanoparticles (e.g., from 6 mg/mL to 10 mg/mL nanoparticles).

Optionally, the dispersion can further comprise other components well known in the art of formulating surface coatings, such as, for example, surfactants, flow control agents, thixotropic agents, fillers, anti-gassing agents, organic co-solvents, catalysts, and other conventional additives.

Optionally, methods of forming functional surfaces can further comprise depositing a functional material on the polymer surface. This can comprise, for example, activating the polymer surface, the multiplicity of re-entrant structures embedded within and protruding from the polymer surface, or a combination thereof for reaction with the functional material (e.g., UV activation of the polymer surface), and covalently attaching the functional material to the polymer surface, the multiplicity of re-entrant structures embedded within and protruding from the polymer surface, or a combination thereof.

The functional material can modulate the surface chemistry (and by extension physical properties) of the functional surface. Thus, by depositing a functional material on the polymer surface, various properties of the functional surface, including the hydrophobicity and/or oleophobicity of the functional surface, can be tuned.

The functional material can include any suitable material(s), including polymers and small molecules. In some cases, the functional material can comprise a low surface energy material, such as a fluorosilane, a fluorosurfactant, a fluoropolymer, or a combination thereof. In some embodiments, the functional material can include a silane. The silane can be halogenated or non-halogenated. In some embodiments, the silane can comprise an alkyl chain, a partially fluorinated alkyl chain, and/or an alkyl chain that has regions that are perfluorinated, any of which may be straight or branched. In some examples, the silane group can comprise one or more perfluorinated aliphatic moieties. In certain embodiments, the functional material can comprise a fluorosilane.

In some examples, the functional material can comprise a silane represented by a general Formula below $$CH_3(CH_2)_m SiR^1 R^2 R^3 \qquad \text{I,}$$

$$CF_3(CF_2)_n (CH_2)_m SiR^1 R^2 R^3 \qquad \text{II, or}$$

$$CHF_2(CF_2)_n (CH_2)_m SiR^1 R^2 R^3 \qquad \text{III}$$

where n and m are integers (n is 0 or greater, and m is 0 or greater), and $R^1$, $R^2$, and $R^3$ are independently a halogen, alkyl, or alkoxy group.

In some embodiments, the functional material can comprise one or more silanes represented by Formulas I-III. In some examples, the functional material can comprise perfluoroalkyltrichlorosilane, perfluoroalkyl(alkyl)dichlorosilane, perfluoroalkyl(alkyl)dialkoxylsilanes, of perfluoroalkyltrialkoxysilanes. Specifically, the functional layer can comprise perfluorododecyltrichlorosilane, perfluorotetradecyltrichlorosilane, perfluorooctyltrichlorosilane, perfluorodecyltrimethoxysilane, perfluorododecyltrimethoxysilane, perfluorotetradecyltrimethoxtsilane, perfluorooctyltrimethoxysilane, perfluorodecyltriethoxysilane, perfluorododecyltrimethoxysilane, perfluorotetradecyltriethoxysilane, perfluorooctyltrimethoxysilane, and perfluorodecylmethyldichlorosilane.

In some embodiments, the functional material can include a fluorosurfactant. Suitable flourosurfactants can include anionic fluorosurfactants and cationic fluorosurfactants.

Examples of suitable fluorosurfactants include those sold under the tradenames FLEXIPEL™, ZONYL®, CAPSTONE®, and MASURF®. Specific examples of suitable fluorosurfactants include FLEXIPEL™ AM-101 partially fluorinated polymer, ZONYL® 9361 anionic fluorosurfactant, CAPSTONE® FS-50 anionic fluorosurfactant, CAPSTONE® FS-63 anionic fluorosurfactant, and MASURF® FP-815CP anionic fluoroacrylate copolymer.

In some embodiments, the functional material can include a fluoropolymer. Examples of fluoropolymers include polyvinylfluoride (PVF), polyvinylidene fluoride (PVDF), polytetrafluoroethylene (PTFE), fluorinated ethylene-propylene (FEP), perfluoroalkoxy polymers, polychlorotrifluoroethylene, polyethylenetetrafluoroethylene, and polyethylenechlorotrifluoroethylene.

The functional material can be uniformly distributed across the polymer surface. Alternatively, the functional material can be patterned on the polymer surface. For example, the functional material can be present at some points on the polymer surface and absent at others, such that the material forming the functional material is present at some points on the functional surface and absent at other points on the functional surface. In other cases, the functional material can be patterned such that the composition of the functional material varies at different points on the polymer surface, such that a first functional material is present at some points on the polymer surface and a second functional material is present at other points on the polymer surface. When the functional material is patterned, the pattern of the functional material can be random or ordered.

The functional surface can exhibit a water contact angle of at least 150° (e.g., at least 155°, at least 160°, or at least 165°), a hexadecane contact angle of at least 150° (e.g., at least 155°, at least 160°, or at least 165°), or both a water contact angle of at least 150° (e.g., at least 155°, at least 160°, or at least 165°) and a hexadecane contact angle of at least 150° (e.g., at least 155°, at least 160°, or at least 165°). The functional surface can exhibit a water tilt angle of less than 10° (e.g., 9° or less, 8° or less, 7° or less, 6° or less, 5° or less, 4° or less, 3° or less, or 2° or less) a hexadecane tilt angle of less than 10° (e.g., 9° or less, 8° or less, 7° or less, 6° or less, 5° or less, 4° or less), 3° or less, or 2° or less), or a water tilt angle of less than 10° (e.g., 9° or less, 8° or less, 7° or less, 6° or less, 5° or less, 4° or less, 3° or less, or 2° or less) and a hexadecane tilt angle of less than 10° (e.g., 9° or less, 8° or less, 7° or less, 6° or less, 5° or less, 4° or less, 3° or less, or 2° or less).

In some embodiments, the functional surface can exhibit a water contact angle of at least 150° (e.g., at least 155°, at least 160°, or at least 165°) and a water tilt angle of less than 10° (e.g., 9° or less, 8° or less, 7° or less, 6° or less, 5° or less, 4° or less, 3° or less, or 2° or less). In some embodiments, the functional surface can exhibit a hexadecane contact angle of at least 150° (e.g., at least 155°, at least 160°, or at least 165°) and a hexadecane tilt angle of less than 10° (e.g., 9° or less, 8° or less, 7° or less, 6° or less, 5° or less, 4° or less, 3° or less, or 2° or less). In some embodiments, the functional surface can exhibit a water contact angle of at least 150° (e.g., at least 155°, at least 160°, or at least 165°), a hexadecane contact angle of at least 150° (e.g., at least 155°, at least 160°, or at least 165°), a water tilt angle of less than 10° (e.g., 9° or less, 8° or less, 7° or less, 6° or less, 5° or less, 4° or less, 3° or less, or 2° or less), and a hexadecane tilt angle of less than 10° (e.g., 9° or less, 8° or less, 7° or less, 6° or less, 5° or less, 4° or less, 3° or less, or 2° or less).

In some cases, the functional surface can exhibit a water contact angle of at least 150°, a hexadecane contact angle of at least 150°, a water tilt angle of less than 10°, and a hexadecane tilt angle of less than 10°. In certain cases, the functional surface can exhibit a water contact angle of at least 160°, a hexadecane contact angle of at least 160°, a water tilt angle of less than 5°, and a hexadecane tilt angle of less than 5°.

The functional surface can exhibit good scrub resistance (also referred to herein as "wear resistance"). In some embodiments, the functional surface can exhibit scrub resistance of at least about 50 cycles at 10 mN (e.g., at least about 100 cycles, at least about 150 cycles, at least about 200 cycles, at least about 300 cycles, at least about 400 cycles, at least about 500 cycles, at least about 600 cycles, at least about 700 cycles, at least about 800 cycles, at least about 900 cycles, at least about 1,000 cycles, at least about 1,100 cycles, at least about 1,200 cycles, at least about 1,300 cycles, at least about 1,400 cycles, or at least about 1,500 cycles) as measured in accordance with the methods described herein. In some embodiments, the functional surface can exhibit scrub resistance of about 2,000 cycles or less (e.g., about 1,500 cycles or less, about 1,200 cycles or less, about 1,000 cycles or less, or about 500 cycles or less) as measured in accordance with the methods described herein.

The functional surface can exhibit a scrub resistance ranging from any of the minimum values described above to any of the maximum values described above. For example, the functional surface can exhibit a scrub resistance of from about 50 cycles to about 2,000 cycles. The scrub resistance of the coating can be measured using any suitable method described herein. Briefly, the surface can be worn using a borosilicate ball with radius 15 μm mounted on a rectangular cantilever with a nominal spring constant. To analyze the change in morphology of the surface before and after the wear experiment, height scans of 100×100 μm$^2$ in area can be obtained using a Si, n-type ($Si_3N_4$) tip with an Al coating operating in tapping mode. Root mean square roughness (RMS) values before and after wear experiments can be obtained.

Also provided herein are functional surfaces made by the methods described herein, as well as articles comprising these surfaces. The functional surfaces can comprising a polymer and a multiplicity of re-entrant structures embedded within and protruding from the polymer. The multiplicity of re-entrant structures are formed from nanoparticle aggregates. Optionally, the functional surface can further comprise a functional material (e.g., a fluorosilane, a fluorosurfactant, a fluoropolymer, or a combination thereof) disposed on (e.g., covalently bound to) the polymer, the multiplicity of re-entrant structures embedded within and protruding from the polymer, or a combination thereof.

In certain embodiments, the functional surfaces described herein can exhibit superhydrophobic and/or superoleophobic properties. As such, the functional surfaces can impart various desirable properties, such as, for example, self-cleaning, anti-fouling, anti-smudge, and anti-icing properties to an article. In some embodiments, the surface can be used to impart microbial resistance, can be used in a location that is prone to the moisture-induced deterioration, can be used where moisture resistance is desired, can be used to impart anti-smudge properties, can be used to impart anti-fouling properties, or a combination thereof. By way of example, the functional surfaces can be used as or in conjunction with filters, membranes, actuators, packaging materials, anti-fingerprint surfaces, self-cleaning and dirtrepellent surfaces, miniaturized sensors or other devices in biochips, floating devices, oil tankers to prevent oil leakage, thermal insulators, cooking ware, traffic, airplanes, boats and buildings, as weight support, as a material with low permittivity, as a selective membrane, as air filter, and in liquid extraction from mixtures.

Specific examples of articles on which the functional surfaces described herein can be applied can include, windows; windshields on automobiles aircraft, and watercraft; freezer doors; condenser pipes; ship hulls; underwater vehicles; underwater projectiles; airplanes and wind turbine blades; indoor and outdoor mirrors; lenses, eyeglasses or other optical instruments; protective sports goggles; masks; helmet shields; glass slides of frozen food display containers; glass covers; buildings walls; building roofs; exterior tiles on buildings; building stone; painted steel plates; aluminum panels; window sashes; screen doors; gate doors; sun parlors; handrails; greenhouses; traffic signs; transparent soundproof walls; signboards; billboards; guardrails; road reflectors; decorative panels; solar cells; painted surfaces on automobiles watercraft, aircraft, and the like; painted surfaces on lamps; fixtures, and other articles; air handling systems and purifiers; kitchen and bathroom interior furnishings and appliances; ceramic tiles; air filtration units; store showcases; computer displays; air conditioner heat exchangers; high-voltage cables; exterior and interior members of buildings; window panes; dinnerware; walls in living spaces, bathrooms, kitchens, hospital rooms, factory spaces, office spaces, and the like; sanitary ware, such as basins, bathtubs, closet bowls, urinals, sinks, and the like; and electronic equipment, such as computer displays.

By way of non-limiting illustration, examples of certain embodiments of the present disclosure are given below.

EXAMPLES

Example 1: Durable, Superoleophobic Polymer-Nanoparticle Composite Surfaces with Re-Entrant Geometry Via Solvent-Induced Phase Transformation Superoleophobic plastic surfaces are useful in a wide variety of applications including anti-fouling, self-cleaning, anti-smudge, and low-drag. Existing examples of superoleophobic surfaces typically rely on poorly adhered coatings or delicate surface structures, resulting in poor mechanical durability. Here, a facile method is described for creating re-entrant geometries desirable for superoleophobicity via entrapment of nanoparticles in polycarbonate surfaces. Nanoparticle incorporation occurs during solvent-induced swelling and subsequent crystallization of the polymer surface. The resulting surface was found to include re-entrant structures, a result of nanoparticle agglomerates acting as nucleation points for polymer crystallization. These surfaces could be further functionalized with fluorosilane to provide a durable, super-repellent surface. This method of impregnating nanoparticles into polymer surfaces could prove useful in improving the anti-bacterial, mechanical, and liquid-repellent properties of plastic devices.

Background

Oil repellency (superoleophobicity) is a desirable surface property for a range of different applications including anti-fouling, self-cleaning, anti-smudge, and lab-on-chip applications. However, superoleophobicity is difficult to accomplish as the surface tensions of oils are much lower than that of water, meaning oil droplets are more likely to display contact angles of <90° on flat surfaces and therefore adding roughness to the surface will lower this angle further.

However, high droplet contact angles can still be achieved, even if the contact angle on the flat surface ($\theta_{flat}$) is low, through the use of re-entrant geometries, where surface asperities create an overhang (i.e. become narrower closer to the surface), FIG. 1. For example, for a surface with inverse trapezoidal features, if the combination of the re-entrant angle ($\alpha$) and $\theta_{flat}$ is ≥90°, the geometry is able to support a favorable shape for the liquid-vapor interface (surface tension is pointing upward) and the liquid does not fully wet the surface (vapor pockets and a composite interface with a low liquid-solid contact fraction), FIG. 1, panel (a).

Structures with re-entrant curvature (spherical, cylindrical, oval etc.), as shown in FIG. 1, panel (b), are able to support high droplet contact angles for various liquids with flat contact angles <90° since it is possible to draw multiple tangents of a corresponding flat surface, as demonstrated in FIG. 1 panel (c). Therefore liquids with various flat contact angles can wet the re-entrant curvature to different extents to achieve a favorable liquid-vapor interface shape. The re-entrant structures in FIG. 1 panel (d) are able to support low flat contact angles ($0°<\theta_{flat}<90°$ and, while they could theoretically support flat contact angles of 0°, the presence of positive pressure in the droplet means that a liquid-vapor interface shape with upward surface tension is required. This is possible with doubly re-entrant geometries, as shown in FIG. 1 panel (e), which incorporate vertical overhangs normal to the surface in addition to the horizontal overhangs parallel to the surface found in FIG. 1 panel (d). Here, tangents on the re-entrant curvature can be drawn beyond those parallel to the flat surface and so a favorable liquid-vapor interface shape where the surface tension is pointing upward can be supported, even with a fully wetting liquid. Such structures need to be designed to minimize the liquid-solid contact fraction to ensure the droplet is resting mostly on air pockets for the surface to be repellent. The structures therefore need to be as thin as possible. However, such surface features are fragile and difficult to fabricate on a large scale and therefore singly re-entrant geometries are more commonly used in liquid repellency.

To repel liquids with low surface tensions, these re-entrant geometries typically need to be paired with a low surface energy material. Fluorinated materials are commonly used as fluorine is very electronegative and has a low polarizability. This results in a low susceptibility to London dispersion forces, leading to weak intermolecular forces, weak cohesive and adhesive forces, and therefore low surface energies.

Many existing methods for creating superoleophobic surfaces rely on coatings to add roughness and low surface tension material to a substrate. Several use a "one-pot" technique with all materials mixed and deposited together. However such techniques typically suffer from poor durability due to the weak interfacial adhesion between the substrate and the low surface tension material required for oil repellency. Instead of using a coating, it is therefore often desirable to treat the surface of the substrate directly to add roughness and lower the surface tension. Techniques specific to different substrates therefore need to be developed. For example, acid etching has been shown to be an effective way of creating superoleophobic aluminum surfaces.

Water and oil-repellent plastic surfaces are of interest for a wide range of industrial and consumer applications such as the creation of packaging that is not fouled by product, reducing wastage and improving the customer experience.

Existing methods for creating nanotextured polymer surfaces typically rely on techniques such as plasma etching, or photolithography, top-down approaches that are expensive, time-consuming and result in wasted material. Alternatively, the roughness of a polymer surface can be altered through the use of nanoparticles. This is sometimes achieved by adding nanomaterials to the polymer melt, however this can result in varying degrees of particle dispersion and the ideal nanocomposite morphology not being met. Nanoobjects can also be dispersed in a monomer, which is then polymerized in situ, allowing for better dispersion of the nanomaterial and less agglomeration, however this technique relies on the use of organic solvents and is less compatible with common industrial processes such as extrusion. Another method to add nanoparticles is to use supercritical $CO_2$ to impregnate the polymer, however this requires the use of high-pressure equipment and results in nanoparticles being impregnated throughout the plastic, affecting the properties of the bulk.

In addition to liquid repellency, polymer nanocomposites find use in other applications. For instance, silver nanoparticles have previously been impregnated into polycarbonate to improve the anti-bacterial properties of plastic catheters. Zirconia nanoparticles were added to polymer films to result in an ultra-hard coating. Finally, gold nanoparticles draw substantial interest due to their catalytic activity and polymer-gold nanocomposites have been shown to catalyze organic reactions. In the above examples, the presence of nanoobjects at the surface or near surface gave rise to the desired properties. Similarly for liquid repellency, it is desirable for the nanoparticle agglomerates to be present at the interface to provide the re-entrant geometry required.

Here, durable superoleophobic polycarbonate has been created through the incorporation of nanoparticles into the polymer surface. Polycarbonate undergoes solvent-induced phase transformation when exposed to acetone and the resulting crystallization leads to a rough, superhydrophobic surface. By introducing nanoparticles into the acetone solvent, polycarbonate-nanoparticle (PC-NP) composites surfaces with re-entrant geometry have been created. The durability and functionality of the surfaces has been tested; durability is important if these surfaces are to be feasible for application in various industries including medical, transportation, aerospace, energy, and construction. Finally, since the nanoparticles are only incorporated near the interface, this technique could be advantageous compared to other polymer nanocomposite fabrication techniques where nanoparticles are distributed throughout the polymer, affecting the properties of the bulk material.

Materials and Methods

Samples

Polycarbonate sheet (PC, Lexan 9030, SABIC Innovative Plastics IP BV) cut to dimensions of 25 by 10 mm were used throughout. Silica nanoparticles (NP, 7 nm diameter, Aerosil 380, Evonik Industries) were dispersed in acetone (Fisher Scientific Inc.) using an ultrasonic homogenizer (Branson Sonifier 450 A, 20 kHz frequency at 35% amplitude) at various concentrations. The polycarbonate samples were immersed in the acetone-NP mixture for 5 min before being removed and allowed to dry in air. To activate the polymer surface for silane attachment, samples were either UV irradiated for 40 min (15 W, λ max=254 nm) or treated with $O_2$ plasma (Plasmalab System 100, Oxford Instruments) at an $O_2$ flow rate of 20 sccm and a power of 40 W for 2 min. Both techniques were found to result in similar levels of activation and only UV irradiated samples are reported. Samples were fluorinated via chemical vapor deposition of a silane, which was required in order to achieve superoleophobicity. One drop of trichloro(1H,1H,2H,2H-perfluorooctyl) silane (fluorosilane, Sigma Aldrich) was deposited next to the samples which were covered and left for 6 h.

Contact Angle and Tilt Angle

For contact angle data, 5-µL droplets of water and n-hexadecane (99%, Alfa Aesar) were deposited onto samples using a standard automated goniometer (Model 290, Ramé-Hart Inc.) and the resulting image of the liquid-air interface analyzed with DROPimage software. Tilt angles were measured by inclining the surface until the 5-µL droplet rolled off. All angles were averaged over at least five measurements on different areas of a sample.

Scanning Electron Microscope Imaging

Top down, scanning electron microscope (SEM, Hitachi S-4300) images were taken to determine the topography of the polycarbonate samples. To image the re-entrant geometry, SEM images (Philips/FEI Sirion) were taken with the sample held at a 75° angle. Samples were mounted with conductive tape and gold-coated prior to SEM imaging.

Atomic Force Microscopy-Infrared Measurements

AFM-IR measurements were carried out on a nanoIR-2 (Anasys Instruments) equipped with tunable optical parametric oscillator laser system (ELSPLA, Model # NT-277/3-XIR3-1 K, rep rate 1 kHz). The AFM images were captured using tapping mode NIR2 probes (PR-EX-TnIR-A-10, resonance frequency=75 kHz, spring const.=1-7 N m-1).

Wear Experiments

The mechanical durability of the surfaces was examined through macrowear experiments performed with an established procedure of using a ball-on-flat tribometer. A sapphire ball of 3 mm diameter was fixed in a stationary holder. Loads of 20 mN and 45 mN were applied normal to the surface, and the tribometer was put into reciprocating motion for 200 cycles. Stroke length was 6 mm with an average linear speed of 1 mm $s^{-1}$. Surfaces were imaged before and after the tribometer wear experiment using an optical microscope with a CCD camera (Nikon Optihot-2) to examine any changes.

Contact pressures for the tribometer wear experiments were calculated based on Hertz analysis. The elastic modulus of polycarbonate, 2.3 GPa, was used as an estimate for the elastic modulus of the composite coating, and a Poisson's ratio of 0.37 was used. Due to the inclusion of $SiO_2$ nanoparticles, the elastic modulus of final coating is expected to be higher, so an underestimated pressure will be obtained with the selected modulus. An elastic modulus of 390 GPa and Poisson's ratio of 0.23 were used for sapphire ball used in the macroscale wear experiments and the mean contact pressures were calculated as 15.3 MPa and 20.0 MPa for low and high loads respectively.

Self-Cleaning Experiment

The self-cleaning characteristics of the surfaces were examined using an experimental setup previously reported (Bhushan, B. (2012), *Biomimetics: Bioinspired Hierarchical-Structured Surfaces for Green Science and Technology*, Springer-Verlag, Heidelberg, Germany). Briefly, coatings were contaminated with silicon carbide (SiC, Sigma Aldrich) in a glass chamber (0.3 m diameter and 0.6 m high) by blowing 1 g of SiC powder onto a sample for 10 s at 300 kPa and allowing it to settle for 30 min. The contaminated sample was then secured on a stage (45° tilt) and water droplets (total volume 5 mL) were dropped onto the surface from a specified height. Once dried, images were taken using an optical microscope with a CCD camera (Nikon, Optihot-2). The removal of particles by the water droplets was compared before and after tests. The ability for the water stream to remove particles was quantified using image analysis software (SPIP 5.1.11, Image Metrology A/S, Horshølm, Denmark).

Anti-Smudge Experiment

The anti-smudge characteristics of the surfaces were examined using an experimental setup previously reported (Bhushan, B. and Muthiah, P. (2013), "Anti-smudge screening apparatus for electronic touch screens," *Microsyst. Technol.* 19, 1261-1263). Coatings were contaminated as reported above. The contaminated sample was then secured on a stage and a hexadecane-impregnated microfiber wiping cloth was glued to a horizontal glass rod (radius 0.5 mm) fixed on a cantilever above the sample. As the cloth was brought in contact with the sample, the microfiber cloth was set to rub the contaminated sample under a load of 5 g for 1.5 cm at a speed of about 0.2 mm s$^{-1}$. Images were taken using an optical microscope with a CCD camera (Nikon, Optihot-2). The removal and transfer of particles by the cloth was compared before and after tests.

Results and Discussion

Figure 2:
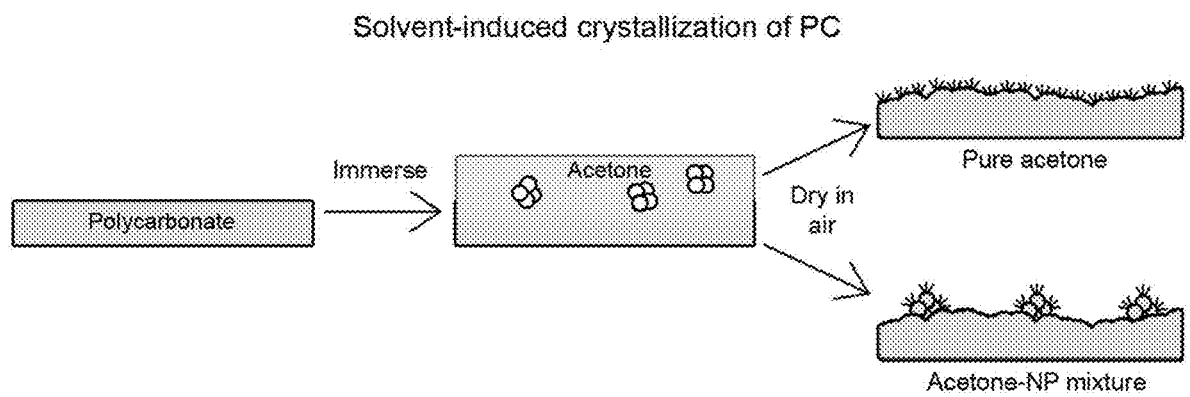
FIG. 2 is a schematic illustration of solvent-induced crystallization of polycarbonate using either pure acetone or an acetone-NP mixture.

In order to achieve re-entrant structures amenable to creating a superoleophobic surface, the surfaces described herein include polycarbonate treated with an acetone-nanoparticle (acetone-NP) mixture. It is found that the nanoparticles become incorporated into the polymer during swelling and the subsequent polymer crystallization can be directed, FIG. 2. By creating polymer-NP composite surfaces in this way, re-entrant geometries are achieved as the nanoparticle agglomerates are impregnated into the surface and near-surface region of the polymer. Nanoparticles incorporated deeper into the polymer would have a less pronounced effect on the surface topography. Small, hydrophilic SiO$_2$ nanoparticles were used as these were susceptible to irreversible aggregation, resulting in non-spherical, micron-sized clusters. In addition, SiO$_2$ nanoparticles are have a high hardness, which aids in the creation of a mechanically durable coating. To achieve the oil repellency, the polymer-nanoparticle composite surface was then activated using UV irradiation and treated with fluorosilane. The re-entrant surface roughness due to nanoparticle incorporation and solvent-induced phase transformation enhances the surface properties of the fluorosilane to result in a superoleophobic surface.

Wettability of Surfaces

Figure 3:
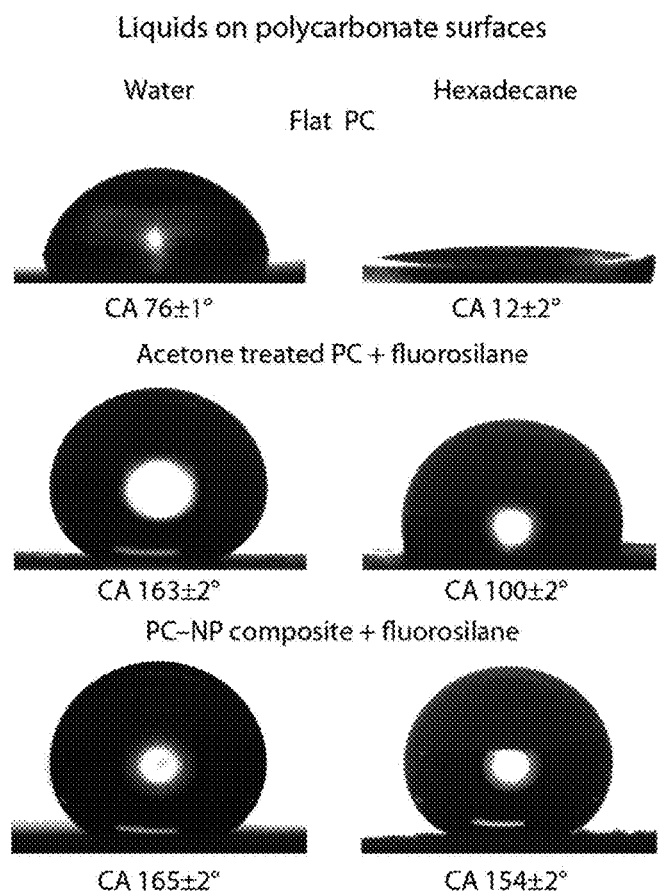
FIG. 3 shows contact angle images for droplets water and hexadecane on: flat PC; fluorinated, acetone-treated PC; and fluorinated PC-NP composite surfaces.
Figure 4:
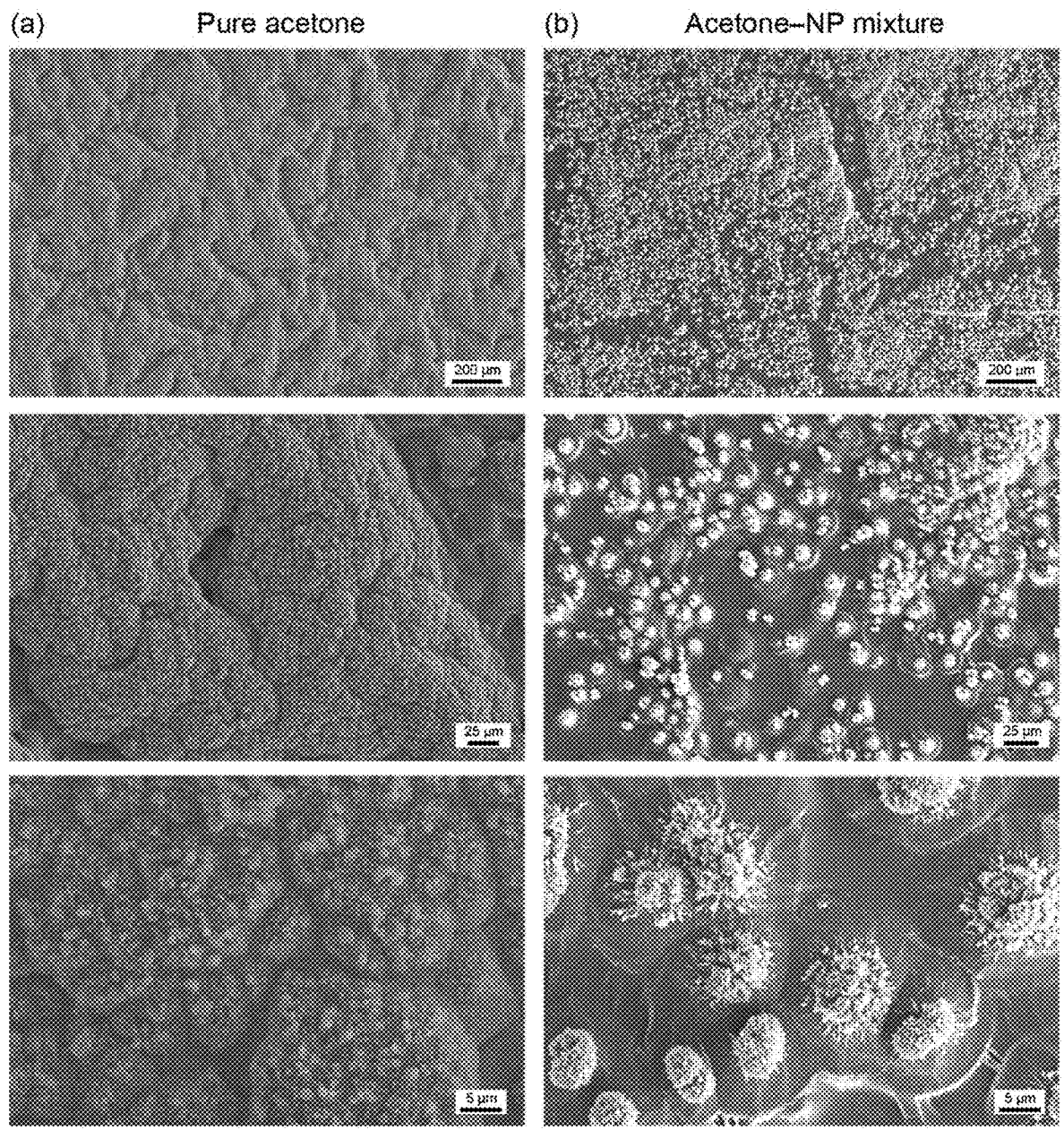
FIG. 4 includes SEM images of solvent-induced crystallization of polycarbonate using either pure acetone or an optimized acetone-NP mixture. Panel (a) shows SEM images obtained upon treatment with pure acetone. The resulting surface includes good coverage of nanostructures atop micron-sized mounds. Panel (b) shows SEM images obtained upon treatment with the acetone-NP mixture. The nanostructures are limited to discrete micron-sized spherulites due to the nanoparticle aggregates acting as nucleation sites for the polycarbonate crystallization.

Untreated polycarbonate (flat PC) is found to be slightly hydrophilic with water contact angles of 76±1°, Table 1 and FIG. 3. After immersion in acetone for 5 min followed by drying in air, the surface became opaque; suggesting crystallization of the polymer had taken place. Previous studies have confirmed that the crystallinity increases after acetone treatment. Indeed, the polycarbonate undergoes a solvent-induced phase transformation leading to a hierarchical structure of crystalline nanostructures atop micron-sized mounds, FIG. 4 panel (a). This roughness is sufficient to create a superhydrophobic surface with water droplets displaying contact angles of 158±1° with low tilt angles due to the ability of the hierarchical surface to trap air and thus create a composite interface. However, due to the low contact angles for hexadecane on flat polycarbonate (ca. 12°), the acetone-treated surface is superoleophilic with hexadecane fully wetting the surface. Activation of the surface by UV irradiation followed by fluorination via silane attachment leads to hexadecane angles of 76±2° for the flat surface and 100±2° for the acetone-treated surface, FIG. 3. This low angle is due to the lower surface tension of hexadecane being unable to support a composite interface on the hierarchical structure of the acetone-treated polycarbonate.

TABLE 1

Comparison of static contact angles and tilt angles for water and hexadecane droplets deposited on polycarbonate surfaces.

| | Water | | Hexadecane | |
|---|---|---|---|---|
| Surface | Contact Angle (°) | Tilt Angle (°) | Contact Angle (°) | Tilt Angle (°) |
| Flat PC | 76 ± 1 | N/A | 12 ± 2 | N/A |
| Flat PC + Fluorosilane | 110 ± 2 | N/A | 76 ± 2 | N/A |
| Acetone treated PC | 158 ± 1 | 3 ± 1 | ~0 | N/A |
| Acetone treated PC + Fluorosilane | 163 ± 2 | 2 ± 1 | 100 ± 2 | N/A |
| PC-NP composite surface | 30 ± 2 | N/A | ~0 | N/A |
| PC-NP composite surface + Fluorosilane | 165 ± 2 | 2 ± 1 | 154 ± 2 | 5 ± 2 |

Figure 5:
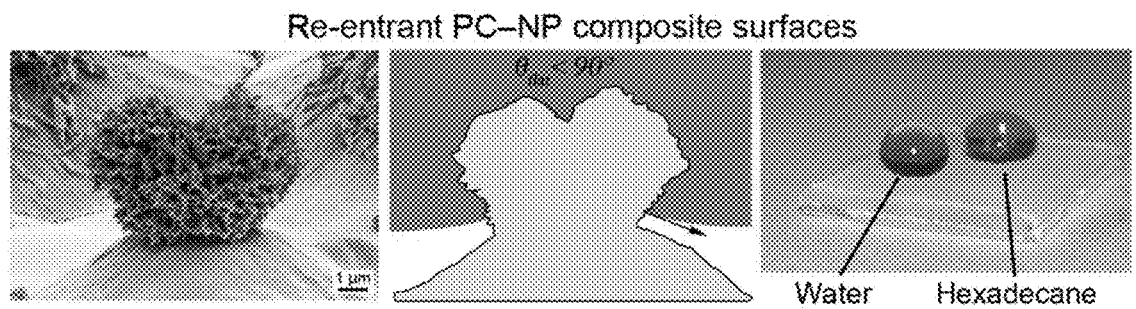
FIG. 5 shows SEM images of the PC-NP composite surface displaying re-entrant geometry. This re-entrant surface, once fluorinated, was found to be repellent towards both hexadecane and water.
Figure 6:
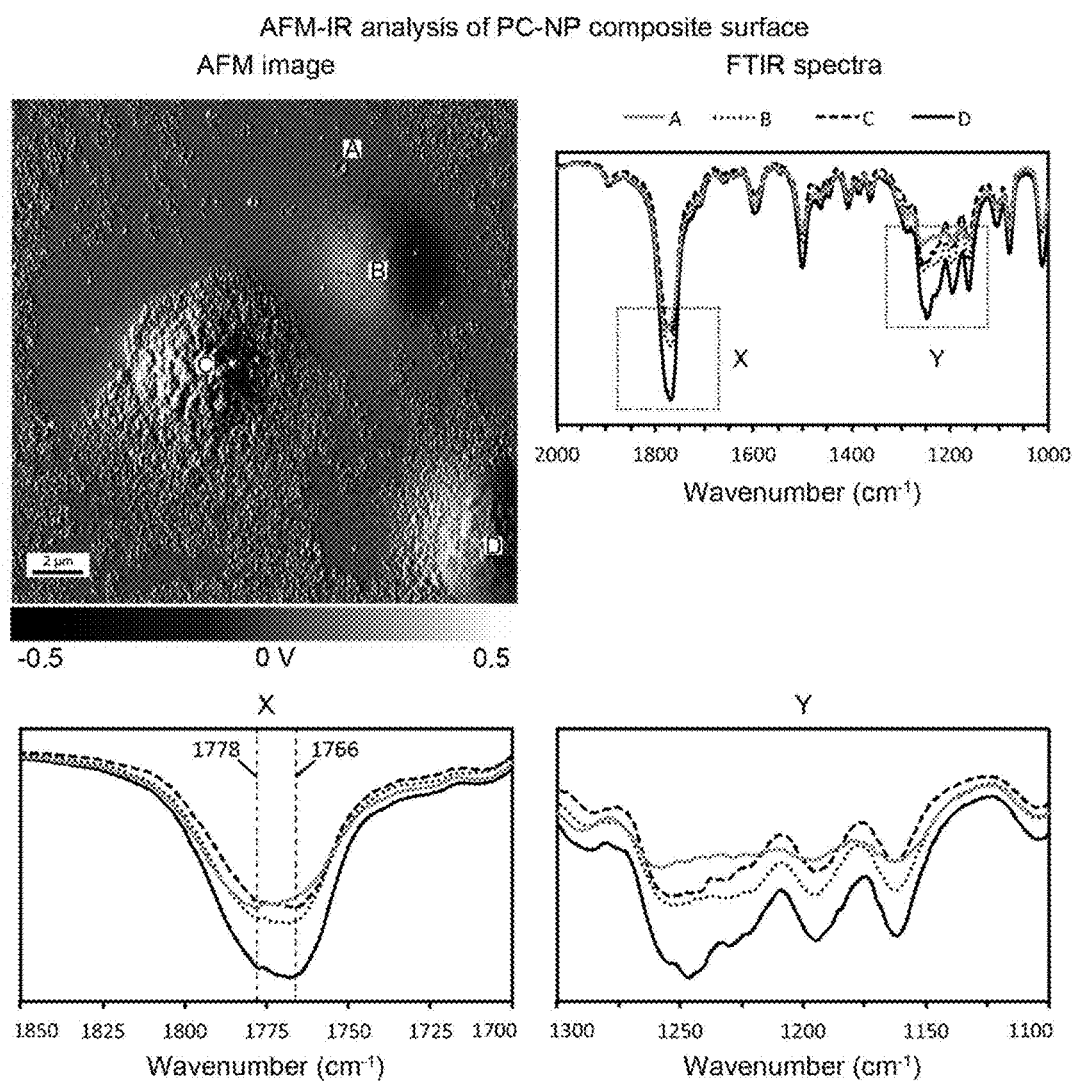
FIG. 6 illustrates the results of an AFM-IR analysis of the PC-NP composite surface. The AFM map displays the untextured region (A) and the re-entrant hierarchical structures (B-D) selected for IR analysis. The FTIR spectra confirm that polycarbonate is present in all regions and that the polymer crystallinity increases on the re-entrant hierarchical structures, suggesting solvent-induced polymer recrystallization occurs primarily on the nanoparticle agglomerates.

In order to create superoleophobic surfaces, re-entrant geometries must be incorporated into the polycarbonate. To accomplish this, nanoparticles were added to the acetone solvent used during the solvent-induced phase transformation of polycarbonate. Polycarbonate samples were placed in the acetone-NP mixture for 5 min and then air-dried. The resulting surface is found to be dramatically different from that of the acetone-treated polycarbonate. Instead of a consistent coverage of nanostructures atop micron mounds, the nanotexturing is instead limited to discrete micron-sized spherulites, FIG. 4, panel (b). This is believed to be due to the presence of the nanoparticle agglomerates, which are incorporated into the surface and near-surface during polymer swelling and act as nucleation sites for polycarbonate crystallization during evaporation of the solvent. The result is re-entrant, hierarchical structures as shown in FIG. 5. Combined AFM-IR measurements were used to further analyze the polycarbonate-nanoparticle (PC-NP) composite surface, and confirmed that the nanoparticle agglomerates become embedded into the polymer surface, FIG. 6. Infrared bands characteristic of polycarbonate were present on both the untextured surface (region A) and the re-entrant hierarchical structures (regions B-D). The major infrared peak classifications were found to be as follows: C=O stretch (1775 cm$^{-1}$), C=C stretch (1496 cm$^{-1}$), and C—O—C bands (1300-1100 cm$^{-1}$). Further analysis of the carbonyl stretch revealed that it consists of two peaks at 1778 and 1766 cm$^{-1}$, the relative intensities of which are known to reflect the amount of non-crystalline and crystalline polycarbonate respectively. By comparing the infrared spectra from the untextured region with that from the re-entrant hierarchical structures, it was found that the relative intensity of the 1766 cm$^{-1}$ band increased, suggesting an increase in crystallinity. Sharper, more defined peaks from the re-entrant hierarchical structures compared to the untextured polymer also suggest an increase in crystallinity. This supports the theory that solvent-induced recrystallization of the polycarbonate occurs predominantly at the nanoparticle agglomerates, likely due to the agglomerates acting as nucleation points.

The water contact angle of the polycarbonate-nanoparticle (PC-NP) composite surface is 30±2°. After UV activation (to facilitate silane attachment) and fluorosilane treatment, the surface becomes superhydrophobic and superoleophobic with contact angles of 165±2° and 154±2° for water and hexadecane respectively, FIG. 3. The presence of the re-entrant, hierarchical structures enables the formation of a favorable liquid-vapor interface for lower surface tension liquids, such as hexadecane, that exhibit contact angles <90° on the corresponding flat surface.

Figure 7:
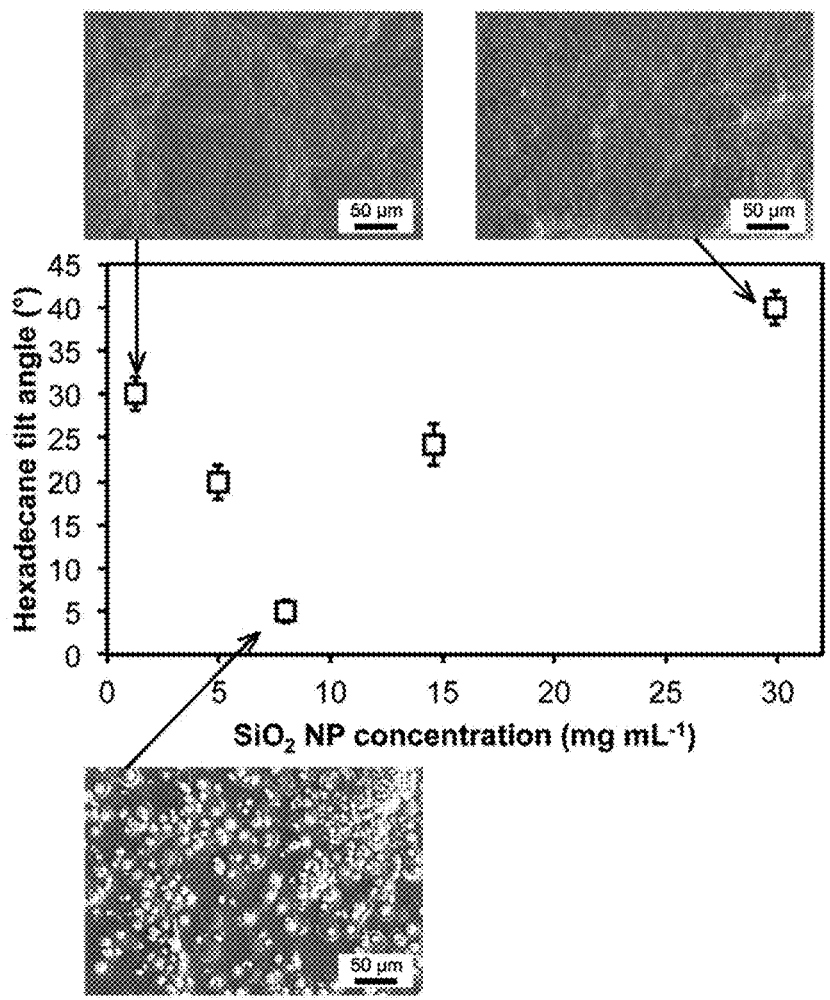
FIG. 7 is a plot showing hexadecane tilt angles on fluorinated PC-NP composite surfaces as a function of $SiO_2$ NP concentration used during acetone-NP treatment. Inset: SEM images of PC-NP composite surfaces treated with acetone-NP mixtures of varying $SiO_2$ NP concentrations.

In order to optimize the surface, the concentration of nanoparticles in the acetone solvent was varied. The hexadecane tilt angle was used as a measure of optimizing the surface treatment, FIG. 7. SEM images were taken of the surfaces formed after treatment with various concentrations of nanoparticle-acetone mixtures. At low nanoparticle concentrations, it was found that the surface closely resembles that of the pure acetone treated surface shown in FIG. 4, panel (a). It is theorized that the nanoparticle concentration is too low for the resulting nanoparticle agglomerates to form nucleation points for the polymer crystallization upon acetone evaporation, the result is poor oil repellency and a high hexadecane tilt angle. As the nanoparticle concentration is increased, discrete spherulites begin to form and the re-entrant geometry of these spherulites results in good oil-repellency and a reduced hexadecane tilt angle. An optimum hexadecane tilt angle of 5° was found on the fluorinated PC-NP composite surface resulting from an acetone-NP mixture concentration of around 8 mg mL$^{-1}$. Above this concentration and the hexadecane tilt angle begins to rise due to contact line pinning on the surface features. At high nanoparticle concentrations, the agglomerates are larger and no longer discrete enough to act as nucleation points for the polymer crystallization, which instead occurs across the entire surface, covering the agglomerates and the space between and resulting in a high hexadecane tilt angle.

Wear Resistance of Surface

Figure 8:
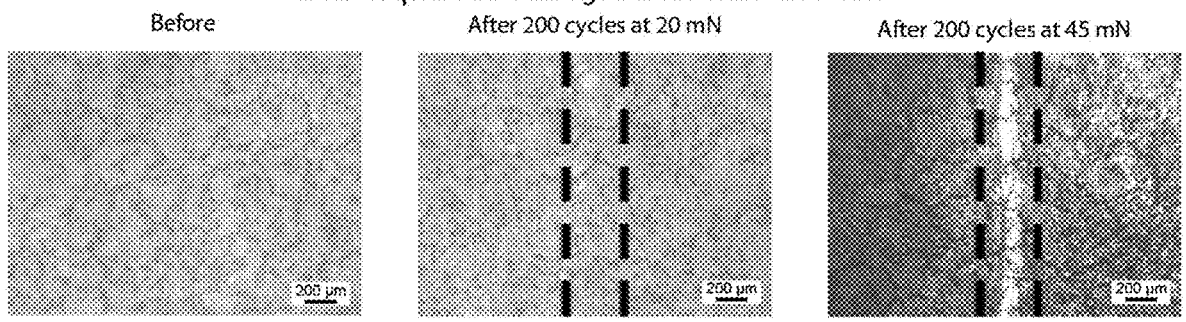
FIG. 8 shows optical micrographs before and after wear experiments using ball-on-flat tribometer using a 3-mm diameter sapphire ball at 20 mN and 45 mN loadings for fluorinated PC-NP composite surfaces.

The mechanical durability of the polymer-nanoparticle composite surface was investigated through the use of tribometer wear experiments and the resulting optical images, showing a portion of the wear track, are displayed in FIG. 8. The initial wear experiments were carried out with a load of 20 mN; however, few observable defects were found on the surface after this experiment and the coating remained oil repellent (tilt angle remains 5±2°, suggesting good fluorosilane attachment to the polymer. To further test the durability of the surface, the load was increased to 45 mN. This increased load resulted in an observable wear scar, upon which hexadecane droplets were found to pin (tilt angle increases to ca. 20°) when rolled over the wear scar location. However higher magnification images confirmed that the surface features were not completely destroyed and, after re-application of the fluorosilane, the surface was found to regain its oil repellency (tilt angle 5±2° suggesting that only the low surface tension material was removed at the higher load and that any damage to the underlying polymer-nanoparticle composite structures was minimal. It is believed that these surfaces are significantly more durable than current examples of superoleophobic surfaces, which typically rely on poorly adhered coatings or delicate surface structures, studies for which typically report either poor mechanical properties or fail to report any durability data. In addition, these surfaces were found to maintain their repellency towards water and oil after 6 months of storage with no noticeable degradation in their liquid repellent properties.

Self-Cleaning Property of Coated Samples

Figure 9:
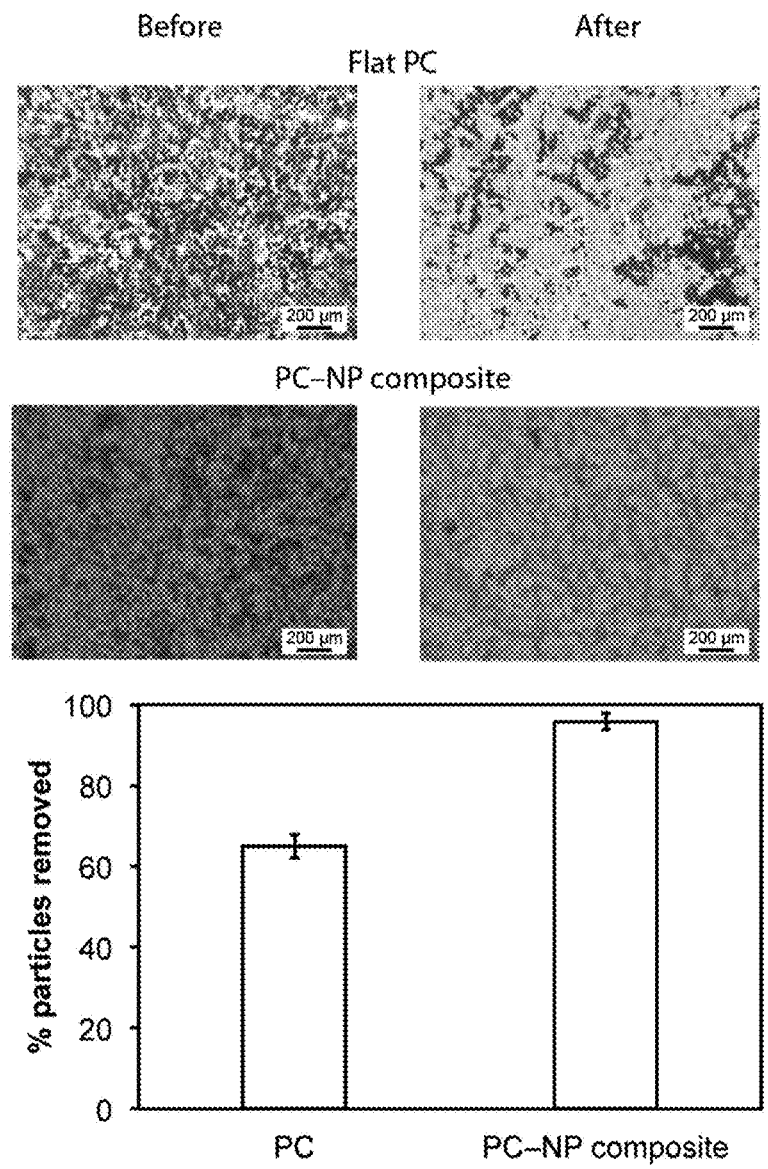
FIG. 9 shows optical micrographs of contaminated coatings before and after self-cleaning test on flat PC and fluorinated PC-NP composite surfaces. Dark spots on coatings and cloth indicate silicon carbide particle contaminants. Image analysis suggests a >90% removal of particles on the composite surface.

To examine the self-cleaning properties, the coatings were contaminated with silicon carbide particles, shown in FIG. 9. A stream of water droplets was then used to clean the surface. On the flat PC coating this resulted in an incomplete removal of the particles with the surface remaining contaminated whereas for the PC-NP composite surface, the water droplets removed almost all of the particles. The superhydrophobic surface is self-cleaning due to the high contact angle and low hysteresis for water. Droplets of water deposited onto this sample are able to roll over the surface with little impediment, collecting less hydrophobic contaminants as they go.

Anti-Smudge Property of Coated Samples

Figure 10:
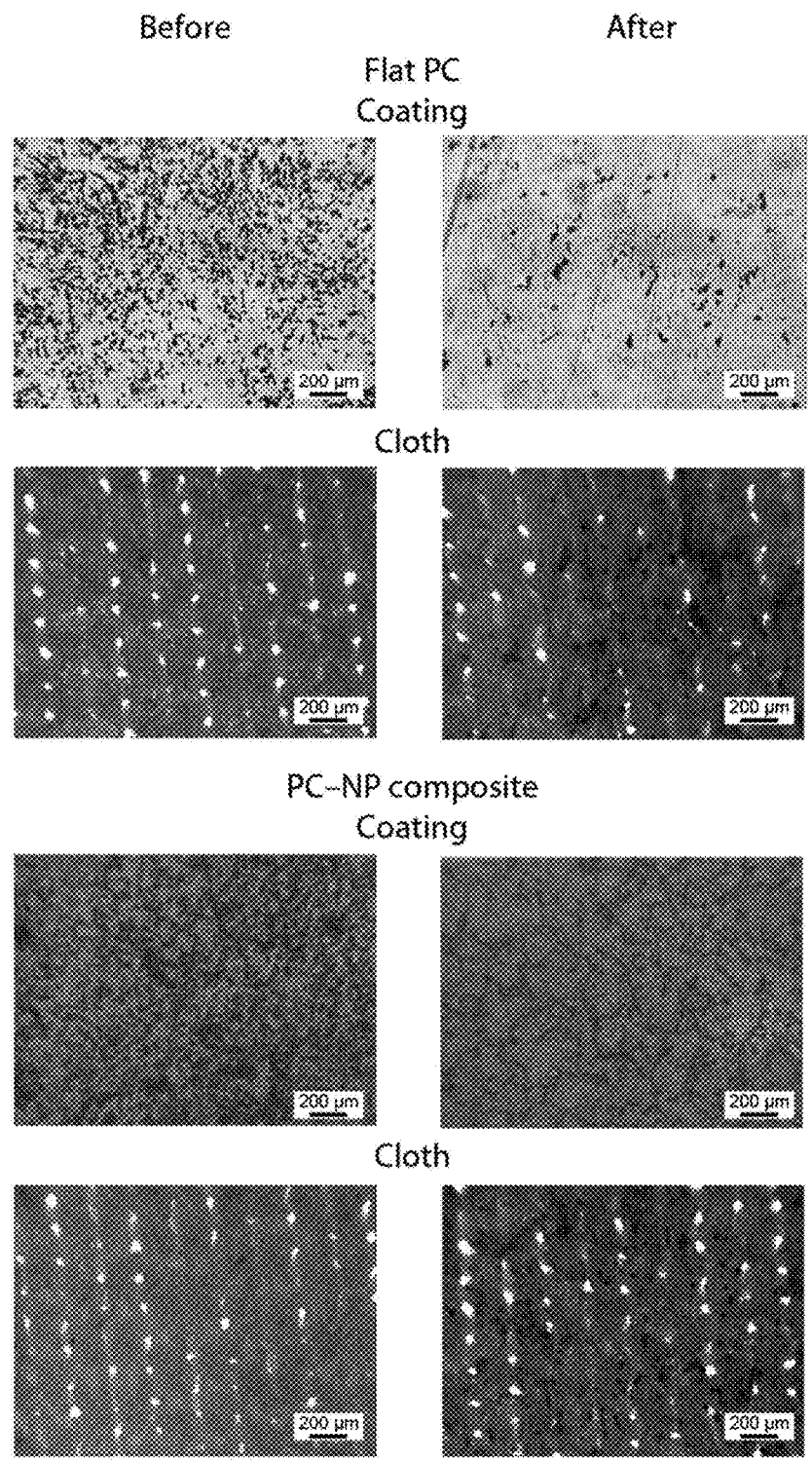
FIG. 10 shows optical micrographs of contaminated coatings and oil-impregnated microfiber cloth before and after smudge test on flat PC and fluorinated PC-NP composite surfaces. Dark spots on coatings and cloth indicate silicon carbide particle contaminants.

To examine the anti-smudge properties of the PC-NP composite surfaces a hexadecane-soaked cloth was used to wipe the contaminated surfaces, shown in FIG. 10. On the flat PC surface this resulted in incomplete removal of the particles with the surface remaining contaminated. For the oil-repellent PC-NP composite surface, the particles were transferred to the cloth with no observable particles remaining on the surface. Similarly to the self-cleaning experiments with water, the anti-smudge property relies on a high contact angle and low hysteresis for the oil. The oil in the cloth is able to collect oleophilic contaminants from the surface of the coating without sticking to the surface.

Conclusion

Durable, superoleophobic plastic surfaces have been created through a facile method involving the impregnation of polycarbonate with silica nanoparticles during solvent-induced phase transformation. Following treatment, re-entrant structures are present on the surface due to the nanoparticle agglomerates acting as nucleation sites for polymer crystallization. After fluorosilane treatment, the surfaces displayed both high contact angles and low tilt angles for water and hexadecane. The super-repellent surfaces were found to be more durable compared to existing superoleophobic surfaces and coatings. The self-cleaning and anti-smudge properties of the surfaces were also demonstrated. It is further envisaged that this technique could be applied to other polymer-solvent combinations where solvent-induced phase transformation occurs. It is also believed that parameters such as nanoparticle size, shape, and chemistry as well as treatment time, temperature and drying conditions will affect the formation of the composite surfaces and therefore the resulting surface properties. Such incorporation of nanoparticles into existing polymer surfaces is an attractive way to improve the anti-bacterial, mechanical, and liquid-repellent properties of plastic devices.

Example 2: Durable, Superoleophobic Polypropylene Surfaces

Polypropylene (PP) is a popular plastic material used in consumer packaging. It would be desirable if such plastic containers were liquid repellent and not so easily fouled by their contents. Existing examples of superoleophobic surfaces typically rely on poorly adhered coatings or delicate surface structures, resulting in poor mechanical durability. Here, we report a facile method for creating superoleophobic PP surfaces via incorporation of nanoparticles (NPs) into the polymer surface. A solvent—NP-PP mixture was spin coated at high temperature to achieve the necessary roughness. Such surfaces were further functionalized with fluorosilane to result in a durable, super-repellent surface. They were also found to exhibit some repellency towards shampoos. This method of incorporating NPs into polymer surfaces could also prove useful in improving the antibacterial, mechanical and liquid-repellent properties of plastic devices.

Background

Oil repellency (superoleophobicity) is a desirable surface property for a range of different applications including anti-fouling, self-cleaning, anti-smudge, and lab-on-chip applications. However, oil repellency is difficult to accomplish as the surface tensions of oils are much lower than that of water, meaning oil droplets are more likely to display contact angles of less than 90° on flat surfaces. However, high droplet contact angles can still be achieved, even if the contact angle on the flat surface ($\theta_{flat}$) is low, through the use of re-entrant geometries, where surface asperities create an overhang (i.e., become narrower closer to the surface). This can be achieved through the use of nanoparticles (NPs). To repel liquids with low surface tensions, a low surface energy material can also be used. Fluorinated materials are commonly used as fluorine is very electronegative and has a low polarizability. This results in a low susceptibility to London dispersion forces, leading to weak intermolecular forces, weak cohesive and adhesive forces and therefore low surface energies.

Many existing methods for creating superoleophobic surfaces rely on applying coatings to a substrate and incorporate the necessary roughness and low surface energy material. Several use a 'one-pot' technique with all materials mixed and deposited together. However, the coatings resulting from these techniques typically suffer from poor durability due to the weak interfacial adhesion between the substrate and the low surface tension material required for oil repellency. Instead of using a coating, it can be desirable to treat the surface of the substrate directly to add roughness and lower the surface tension. Techniques specific to different substrates therefore need to be developed. For example, acid etching has been shown to be an effective way of creating superoleophobic aluminum surfaces and an acetone-NP mixture can result in solvent-induced phase transformation for polycarbonate to create superoleophobic, nanocomposite surfaces.

Polypropylene (PP) is a common polymer used in a wide variety of applications including consumer packaging, automotive parts and textiles. Water and oil-repellent PP surfaces are therefore of interest for a wide range of industrial and consumer applications such as in packaging, where it is desirable for the product to be repelled from and not foul the container, reducing wastage and improving the customer experience. PP is commonly found in the bottles and caps used for shampoos, laundry detergents and soaps. Such products contain surfactants, which lower the surface tension of the liquid to aid in cleaning. Surfactant molecules can attach to the walls of the packaging, where they strongly adhere. It would therefore be beneficial if the PP surface could be treated so as to be repellent to water, oils and low surface tension materials. Water repellent PP has been demonstrated by solvent casting a PP film from a mixture of good (xylene) and bad (methyl ethyl ketone) solvents (which dissolve and precipitate the polymer respectively) or by dipping the substrate in a xylene-NP solution. In both cases, samples were found to be superhydrophobic, however, durability experiments were not carried out. In addition, these PP surfaces were not repellent to both water and oils.

Here, durable superoleophobic PP has been created through the incorporation of NPs into the polymer surface. The durability and functionality of the surfaces has been tested; durability is important if these surfaces are to be feasible for application in various industries including medical, transportation, construction and consumer goods packaging. Finally, as the NPs are only incorporated near the interface, this technique could be advantageous compared with other polymer nanocomposite fabrication techniques where NPs are distributed throughout the polymer, affecting the properties of the bulk material.

Materials and Methods

Figure 11:
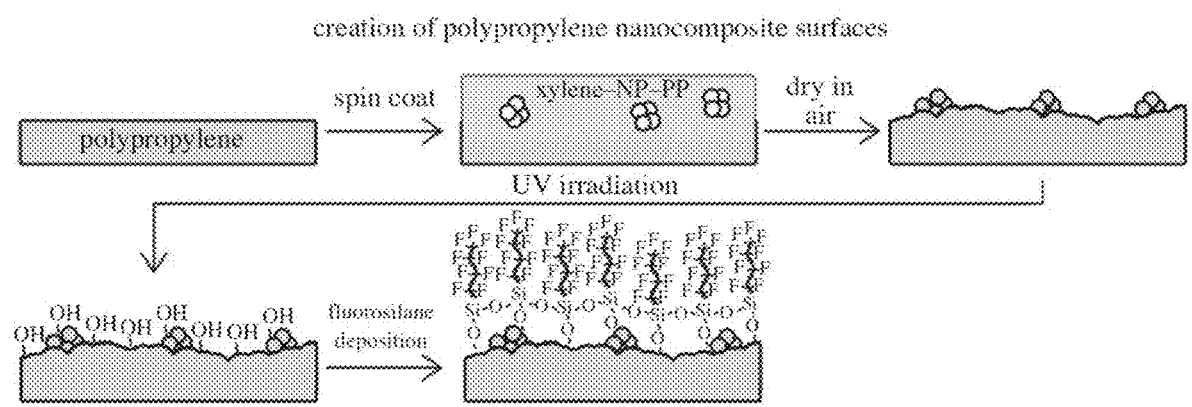
FIG. 11 is a schematic illustration of solvent-induced crystallization of polypropylene (PP) using a xylene-NP-PP mixture.

In order to achieve structures amenable to creating a superoleophobic surface, the surfaces described herein include PP treated with a xylene-NP-PP mixture heated to 135° C., FIG. 11. By spin coating this mixture onto a PP substrate, a nanocomposite polymer surface was formed. By creating polymer-NP composite surfaces in this way, re-entrant geometries suitable for oil repellency were achieved. NPs incorporated deeper into the polymer would have a less pronounced effect on the surface topography. Small, hydrophilic $SiO_2$ NPs were used as these were susceptible to irreversible aggregation, resulting in non-spherical, μ-sized clusters. In addition, $SiO_2$ NPs have high hardness, which aids in the creation of a mechanically durable coating. To achieve the oil repellency, the polymer-NP composite surface was then activated using UV irradiation and treated with fluorosilane. The re-entrant surface roughness due to NP incorporation and solvent-induced phase transformation enhances the surface properties of the fluorosilane to result in a superoleophobic surface.

Samples

PP sheet (PP, ASTM D4101-0112, SPI) cut to dimensions of 25×10 mm were used throughout. SilicaNPs (NPs, 7 nm diameter, Aerosil 380, Evonik Industries) were dispersed in xylene (Mallinckrodt) using an ultrasonic homogenizer (Branson Sonifier 450A, 20 kHz frequency at 35% amplitude) at various concentrations. PP (0.6 g) was then added to the mixture. The xylene-NP-PP mixture was heated to a temperature of 135° C. in a glass flask fitted with a water-cooled condenser to prevent solvent evaporation and 1 ml was added to the PP surface via spin coating and the surface was allowed to dry in air. To activate the polymer surface for silane attachment, samples were UV irradiated for at least 12 h (15 W, λmax=254 nm). Samples were fluorinated via chemical vapor deposition of a silane, which was required in order to achieve superoleophobicity. One drop of trichloro (1H,1H,2H,2H-perfluorooctyl) silane (fluorosilane, Sigma Aldrich) was deposited next to the samples which were covered and left for 2 h.

Contact Angle and Tilt Angle

For contact angle data, 5 μl droplets of water and n-hexadecane (99%, Alfa Aesar) were deposited onto samples using a standard automated goniometer (Model 290, Ramé-Hart Inc.) and the resulting image of the liquid-air interface was analysed with DROPimage software. Tilt angles were measured by inclining the surface until the 5 μl droplet rolled off. All angles were averaged over at least five measurements on different areas of a sample.

Scanning Electron Microscopy

Scanning electron microscope (SEM, Philips/FEI Sirion) micrographs were taken to determine the topography of the PP samples. To image the re-entrant geometry, SEM images were taken with the sample held at a 70° angle. Samples were mounted with conductive tape and gold-coated prior to SEM imaging.

Wear Experiments

The mechanical durability of the surfaces was examined through macrowear experiments performed with an established procedure of using a ball-on-flat tribometer. A sapphire ball of 3 mm diameter was fixed in a stationary holder. Loads of 10 mN and 45 mN were applied normal to the surface and the tribometer was put into reciprocating motion for 200 cycles. Stroke length was 6 mm with an average linear speed of 1 mm s$^{-1}$. Surfaces were imaged before and after the tribometer wear experiment using an optical microscope with a CCD camera (Nikon Optihot-2) to examine any changes.

Contact pressures for the tribometer wear experiments were calculated based on Hertz analysis. The elastic modulus of PP, 1.3 GPa, was used as an estimate for the elastic modulus of the composite coating and a Poisson's ratio of 0.42 was used. Owing to the inclusion of $SiO_2$ NPs, the elastic modulus of final coating is expected to be higher, so an underestimated pressure will be obtained with the selected modulus. An elastic modulus of 390 GPa and Poisson's ratio of 0.23 were used for sapphire ball used in the macroscale wear experiments and the mean contact pressures were calculated as 8.6 MPa and 14.2 MPa for low and high loads, respectively.

Shampoo Repellency

To evaluate the repellency of these surfaces towards consumer products, shampoo (Head and Shoulders, Procter and Gamble Co.) was poured onto the surface and the resulting surface-liquid interaction was photographed.

Results and Discussion

Wettability of Surfaces

Figure 12:
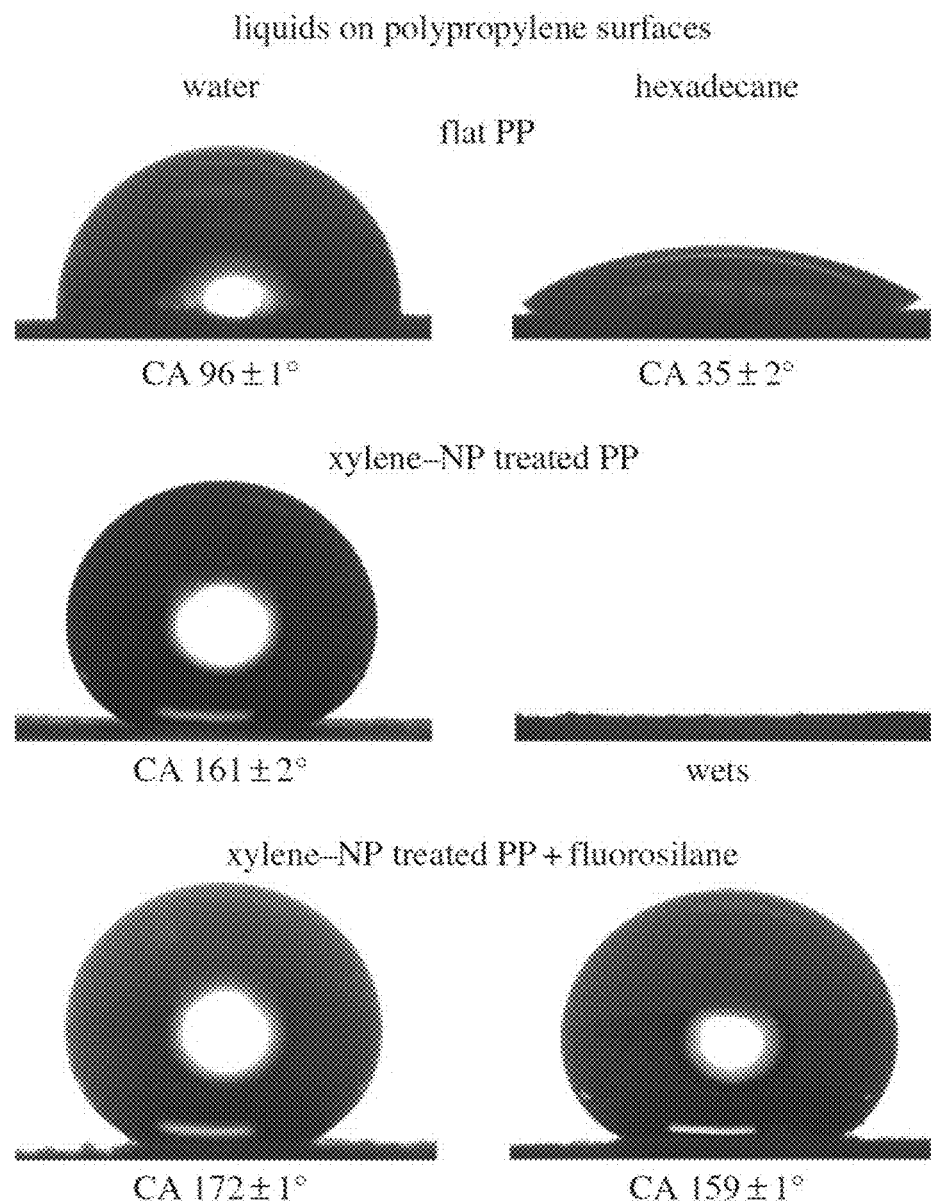
FIG. 12 shows contact angle images for droplets water and hexadecane on: flat PP; PP-NP composite surfaces; and fluorinated PP-NP composite surfaces.
Figure 13:
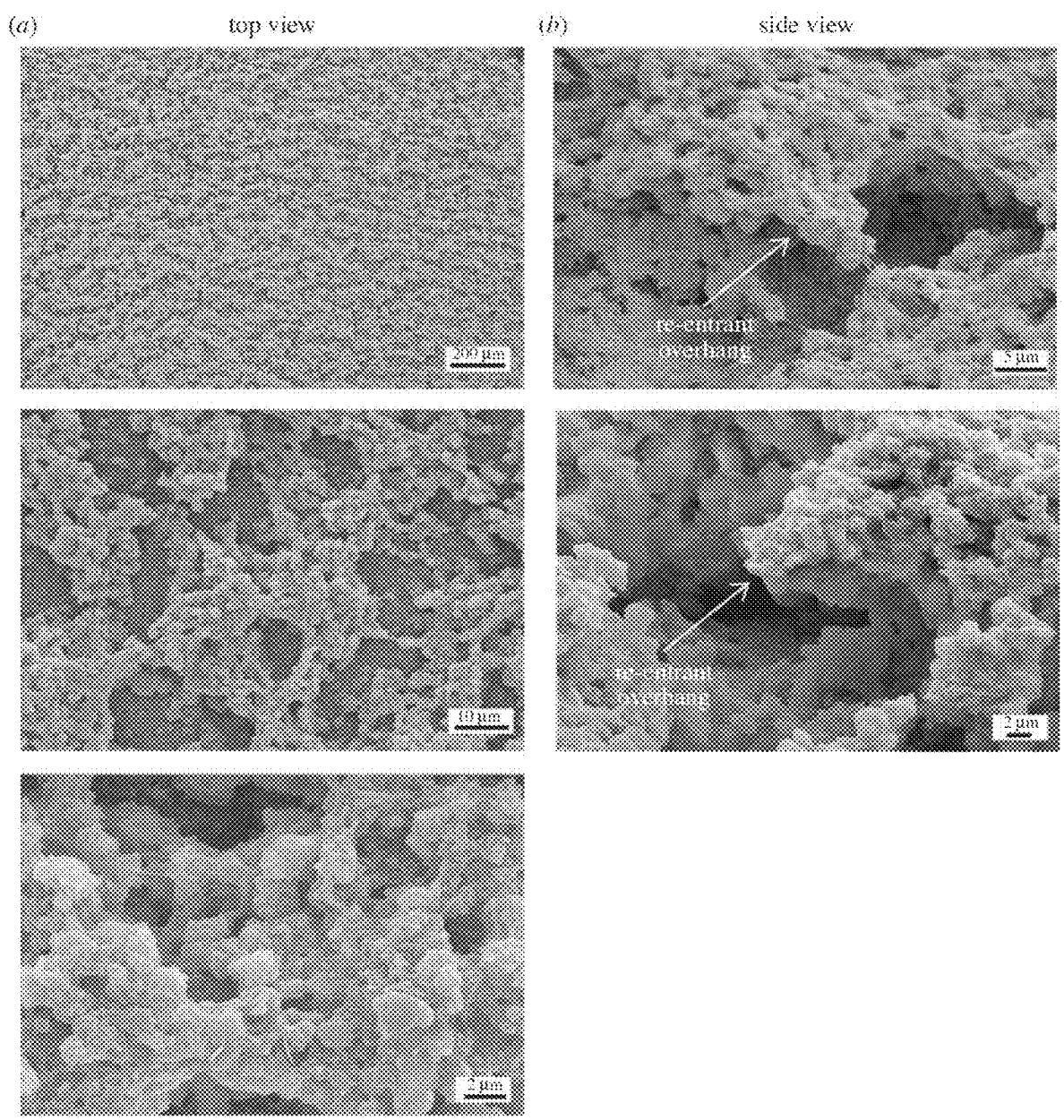
FIG. 13 shows SEM images of superoleophobic PP after spin coating of an optimized xylene-NP-PP mixture. Panel (a) shows top views, while panel (b) shows side views, where the re-entrant, overhang geometry (sample tilted 70°).

Untreated PP (flat PP) is found to be slightly hydrophobic with water contact angles of 96±1°, Table 2 and FIG. 12. After treatment with the xylene-NP-PP mixture followed by drying in air, the surface became superhydrophobic, with water contact angles of 161±2° and tilt angles of 2±1°. This superhydrophobicity is due to inclusion of NPs in the xylene mixture leading to the formation of a rough surface. The PP dissolved in the xylene helps to bind the NPs to the substrate after spin coating. The resulting rough surface contains a hierarchical surface morphology with re-entrant, overhanging geometry, FIG. 13. This morphology is sufficient to create a superhydrophobic state in water due to the ability of the hierarchical surface to trap air and thus create a composite interface. However, owing to the low contact angles for hexadecane on flat PP (35±2°), the xylene-treated surface is superoleophilic with hexadecane fully wetting the surface, FIG. 12. To attain superoleophobicity, a low surface energy material is also used.

TABLE 2

Comparison of static contact angles and tilt angles for water and hexadecane droplets deposited on polypropylene surfaces.

| | Water | | Hexadecane | |
|---|---|---|---|---|
| Surface | Contact Angle (°) | Tilt Angle (°) | Contact Angle (°) | Tilt Angle (°) |
| Flat PP | 96 ± 1 | N/A | 35 ± 2 | N/A |
| Flat PP + Fluorosilane | 110 ± 2 | N/A | 76 ± 2 | N/A |
| PP-NP composite surface | 161 ± 2 | 2 ± 1 | ~0 | N/A |
| Pp-NP composite surface + Fluorosilane | 172 ± 2 | 1 ± 1 | 159 ± 1 | 4 ± 1 |

After UV activation (to facilitate silane attachment) and fluorosilane treatment, the surface became superhydrophobic and superoleophobic with contact angles of 172±1° and 159±1° for water and hexadecane, respectively, FIG. 12. The combination of the fluorosilane with the re-entrant, hierarchical structures obtained from NP incorporation enables the formation of a favourable liquid-vapor interface for lower surface tension liquids, such as hexadecane, that exhibit contact angles less than 90° on the corresponding flat surface.

Figure 14:
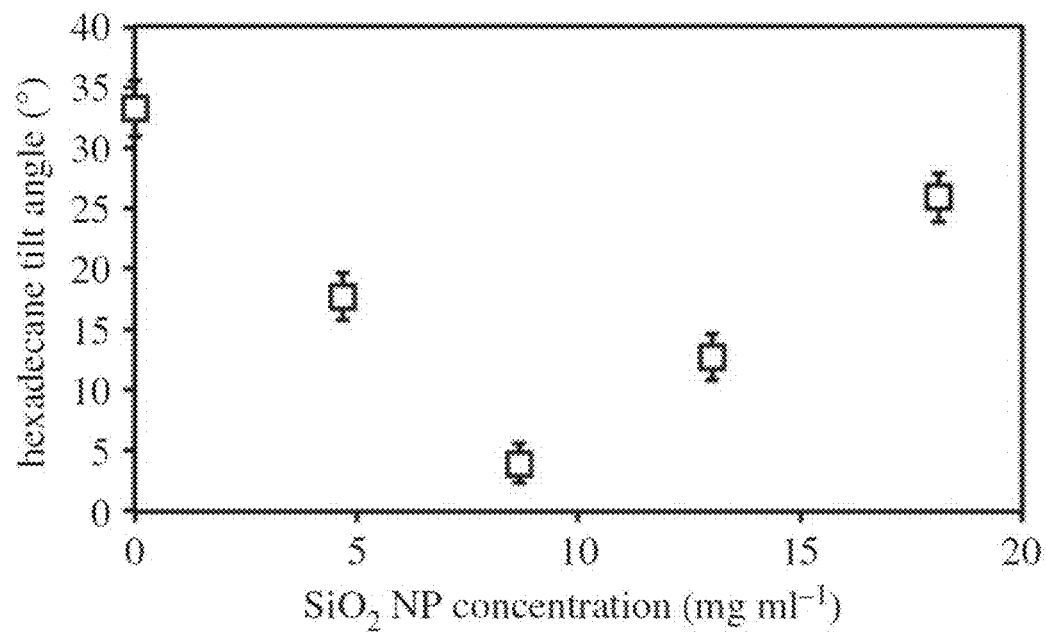
FIG. 14 is a plot showing hexadecane tilt angles on fluorinated PP-NP composite surfaces as a function of $SiO_2$ NP concentration used during xylene-NP-PP treatment.

In order to optimize the surface, the concentration of NPs in the xylene solvent was varied. The hexadecane tilt angle was used as a measure of optimizing the surface treatment, FIG. 14. An optimum hexadecane tilt angle of 4±1° was found on the fluorinated PP-NP composite surface resulting from a xylene-NP mixture concentration of around 8-9 mg mL$^{-1}$. Above this concentration and the hexadecane tilt angle begins to rise due to contact line pinning on the surface features.

Wear Resistance of Surface

Figure 15:
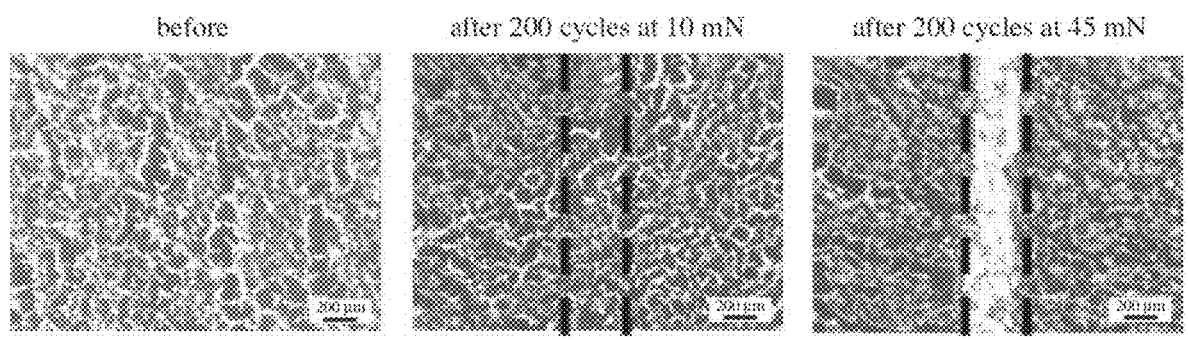
FIG. 15 shows optical micrographs before and after wear experiments using ball-on-flat tribometer using a 3-mm diameter sapphire ball at 10 mN and 45 mN loadings for fluorinated PP-NP composite surfaces.

The mechanical durability of the polymer-NP composite surface was investigated through the use of tribometer wear experiments and the resulting optical images, showing a portion of the wear track, are displayed in FIG. 15. The initial wear experiments were carried out with a load of 10 mN; however, no observable defect was found on the surface after this experiment and the coating remained oil repellent, suggesting good fluorosilane attachment to the polymer. Therefore, to further test the durability of the surface, the load was increased to 45 mN. This increased load resulted in an observable wear scar, upon which hexadecane droplets were found to pin (tilt angle increases) when rolled over the wear scar location. However, the images confirmed that the surface features were not completely destroyed the surface may regain its oleophobicity after re-application of the fluorosilane layer. It is believed that these surfaces are significantly more durable than many other examples of superoleophobic surfaces, which typically rely on poorly adhered coatings or delicate surface structures. Many studies typically report either poor mechanical properties or fail to report any durability data.

Shampoo Repellency

Figure 16:
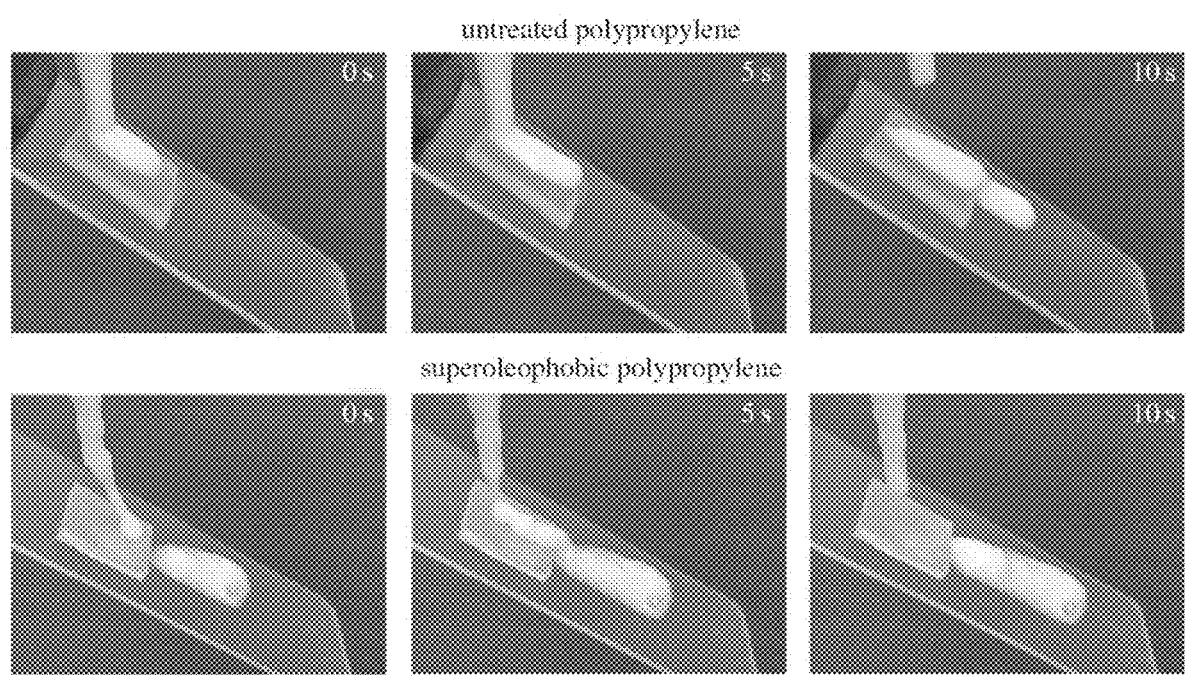
FIG. 16 shows photographs demonstrating the shampoo repellency of superoleophobic PP compared to an untreated sample.

PP is a common material used in the creation of bottles and bottle caps for consumer products. One such product is shampoos, which comprise surfactants among other ingredients. To test the surface repellency towards these liquids, shampoo was poured over the superoleophobic PP. During testing, it was found that the superoleophobic PP surface was able to repel the shampoo, with the viscous liquid sliding down the surface with no visible product remaining on the substrate, as seen in FIG. 16. This is compared to shampoo deposited onto untreated PP, which remains for a greater period of time and fouls the surface. However, if shampoo is left on the superoleophobic PP surface for a significant amount of time, there is some reduction in the repellent nature of the material. The superoleophobic material reported here could therefore find use in applications where contact with the fouling product is minimal (such as bottle cap or single-use applications). However, more work is required to fully achieve shampoo repellency for PP surfaces in constant contact with shampoo such as the inside of a typical consumer bottle.

Conclusion

Durable, superoleophobic PP surfaces have been created through a facile method involving the spin coating of a xylene-NP-PP mixture. Following UV activation and fluorosilane coupling, the low surface energy material, combined with the re-entrant surface structures, results in a surface that displays both high contact angles and low tilt angles for water and hexadecane. The super-repellent surfaces were found to be more durable compared with existing superoleophobic surfaces and coatings. The surfaces were also found to repel shampoo to some extent, with droplets sliding from the surface. However, long-term repellency to shampoo remains a challenge. Such incorporation of NPs into existing polymer surfaces is an attractive way to improve the anti-bacterial, mechanical and liquid-repellent properties of plastic devices.

The devices, systems, and methods of the appended claims are not limited in scope by the specific devices, systems, and methods described herein, which are intended as illustrations of a few aspects of the claims. Any devices, systems, and methods that are functionally equivalent are intended to fall within the scope of the claims. Various modifications of the devices, systems, and methods in addition to those shown and described herein are intended to fall within the scope of the appended claims. Further, while only certain representative devices, systems, and method steps disclosed herein are specifically described, other combinations of the devices, systems, and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A method of forming a functional surface, the method comprising:
    providing a dispersion comprising nanoparticles dispersed in a solvent; and
    applying the dispersion to a polymer surface to induce a structural change in the polymer and form a multiplicity of re-entrant structures embedded within and protruding from the polymer surface,
    wherein the re-entrant structures are formed from aggregates of the nanoparticles and comprise a horizontal overhang parallel to the polymer surface, and
    wherein the structural change in the polymer comprises crystals formed from solvent induced crystallization of the polymer at the nanoparticle aggregate.

2. The method of claim 1, wherein the dispersion comprises the nanoparticles dispersed in a solvent that swells the polymer.

3. The method of claim 1, wherein the dispersion comprises the nanoparticles dispersed in a solution of the solvent and the polymer.

4. The method of claim 1, wherein applying the dispersion to the polymer surface comprises heating the dispersion and depositing the dispersion on the polymer surface.

5. The method of claim 4, wherein heating the dispersion comprises heating the dispersion to a temperature greater than the melting point of the polymer.

6. The method of claim 1, wherein the nanoparticles comprise hydrophilic nanoparticles.

7. The method of claim 1, wherein the nanoparticles have an average particle size, as determined by electron microscopy, of from 1 nm to 200 nm.

8. The method of claim 1, wherein the nanoparticles comprise silicon dioxide nanoparticles.

9. The method of claim 1, wherein the dispersion comprises from 5 mg/mL to 15 mg/mL nanoparticles.

10. The method of claim 1, further comprising depositing a functional material on the polymer surface.

11. The method of claim 10, wherein depositing the functional material comprises covalently attaching the functional material to the polymer surface, the multiplicity of re-entrant structures embedded within and protruding from the polymer surface, or a combination thereof.

12. The method of claim 10, wherein the functional material comprises a low surface energy material.

13. The method of claim 12, wherein the functional material comprises a fluorosilane, a fluorosurfactant, a fluoropolymer, or a combination thereof.

14. The method of claim 1, wherein the functional surface exhibits a water contact angle of at least 150° and a hexadecane contact angle of at least 150°.

15. The method of claim 1, wherein the functional surface exhibits a water tilt angle of less than 10° and a hexadecane tilt angle of less than 10°.

16. The method of claim 1, wherein the re-entrant structures are non-spherical.

17. A method of forming a functional surface, the method comprising:
    providing a dispersion comprising nanoparticles dispersed in a solvent,
    wherein the nanoparticles have a monodispersed distribution of particle size; and
    applying the dispersion to a polymer surface to induce a structural change in the polymer and form a multiplicity of re-entrant structures embedded within and protruding from the polymer surface,
    wherein the re-entrant structures are formed from aggregates of the nanoparticles and comprise a horizontal overhang parallel to the polymer surface; and
    wherein the structural change in the polymer comprises crystals formed from solvent induced crystallization of the polymer at the nanoparticle aggregate.

* * * * *